(12) United States Patent
Kubec

(10) Patent No.: US 11,572,825 B1
(45) Date of Patent: Feb. 7, 2023

(54) TURBOCHARGER FLEXIBLE BEARING CARTRIDGE ASSEMBLY

(71) Applicant: Garrett Transportation I Inc., Torrance, CA (US)

(72) Inventor: Jiri Kubec, Brno (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/564,479

(22) Filed: Dec. 29, 2021

(51) Int. Cl.
| | |
|---|---|
| *F02B 39/14* | (2006.01) |
| *F16C 27/02* | (2006.01) |
| *F04D 29/04* | (2006.01) |
| *F04D 17/10* | (2006.01) |
| *F04D 29/046* | (2006.01) |

(52) U.S. Cl.
CPC .............. *F02B 39/14* (2013.01); *F04D 17/10* (2013.01); *F04D 29/046* (2013.01); *F16C 27/02* (2013.01); *F16C 2360/24* (2013.01)

(58) Field of Classification Search
CPC ........ F02B 39/14; F04D 17/10; F04D 29/046; F16C 27/02; F16C 17/02; F16C 17/26; F16C 35/02; F16C 2360/24; F02D 41/0007; F02D 23/00
See application file for complete search history.

(56) References Cited

U.S. PATENT DOCUMENTS

| | | | | |
|---|---|---|---|---|
| 9,222,511 | B2* | 12/2015 | Lee | F16C 33/103 |
| 9,482,274 | B2* | 11/2016 | Ertas | F16C 32/0677 |
| 9,618,039 | B2* | 4/2017 | Arnold | B23C 3/34 |
| 10,641,277 | B2* | 5/2020 | Hirata | F16J 15/52 |
| 11,326,475 | B2* | 5/2022 | Uesugi | F01D 25/24 |
| 2013/0302148 | A1* | 11/2013 | Solanki | F16J 15/0887 |
| | | | | 415/134 |

FOREIGN PATENT DOCUMENTS

| | | |
|---|---|---|
| DE | 195 18 670 C2 | 11/1996 |
| DE | 199 53 269 A1 | 6/2001 |
| DE | 10 2006 0101 655 B4 | 9/2007 |

OTHER PUBLICATIONS

Liu et al. Dynamic Behaviour Analysis of Turbocharger Rotor-Shaft System in Thermal Environment Based on Finite Element Method. Shock and Vibration. 2020, pp. 1-18 (10.1155/2020/8888504).

\* cited by examiner

*Primary Examiner* — Audrey B. Walter
*Assistant Examiner* — Dapinder Singh
(74) *Attorney, Agent, or Firm* — Brian J. Pangrle

(57) ABSTRACT

A flexible cartridge assembly can include a flexible shell that includes a flexible portion disposed between a compressor-side portion and a turbine-side portion, where the flexible portion includes a series of arc-shaped cutouts disposed axially along at least a portion of the flexible portion; a compressor-side bearing assembly; and a turbine-side bearing assembly.

19 Claims, 19 Drawing Sheets

TURBOCHARGER FLEXIBLE BEARING CARTRIDGE ASSEMBLY

TECHNICAL FIELD

Subject matter disclosed herein relates generally to turbochargers for internal combustion engines.

BACKGROUND

A turbocharger can include a rotating group that includes a turbine wheel and a compressor wheel that are connected to one another by a shaft. For example, a turbine wheel can be welded or otherwise connected to a shaft to form a shaft and wheel assembly (SWA) and a compressor wheel can be fit to the free end of the shaft. As an example, a shaft that is attached to one or more bladed wheels may be supported by one or more bearings disposed in a bearing housing, which may form a center housing rotating assembly (CHRA). During operation of a turbocharger, depending on factors such as size of various components, a SWA may be expected to rotate at speeds in excess of 200,000 rpm.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
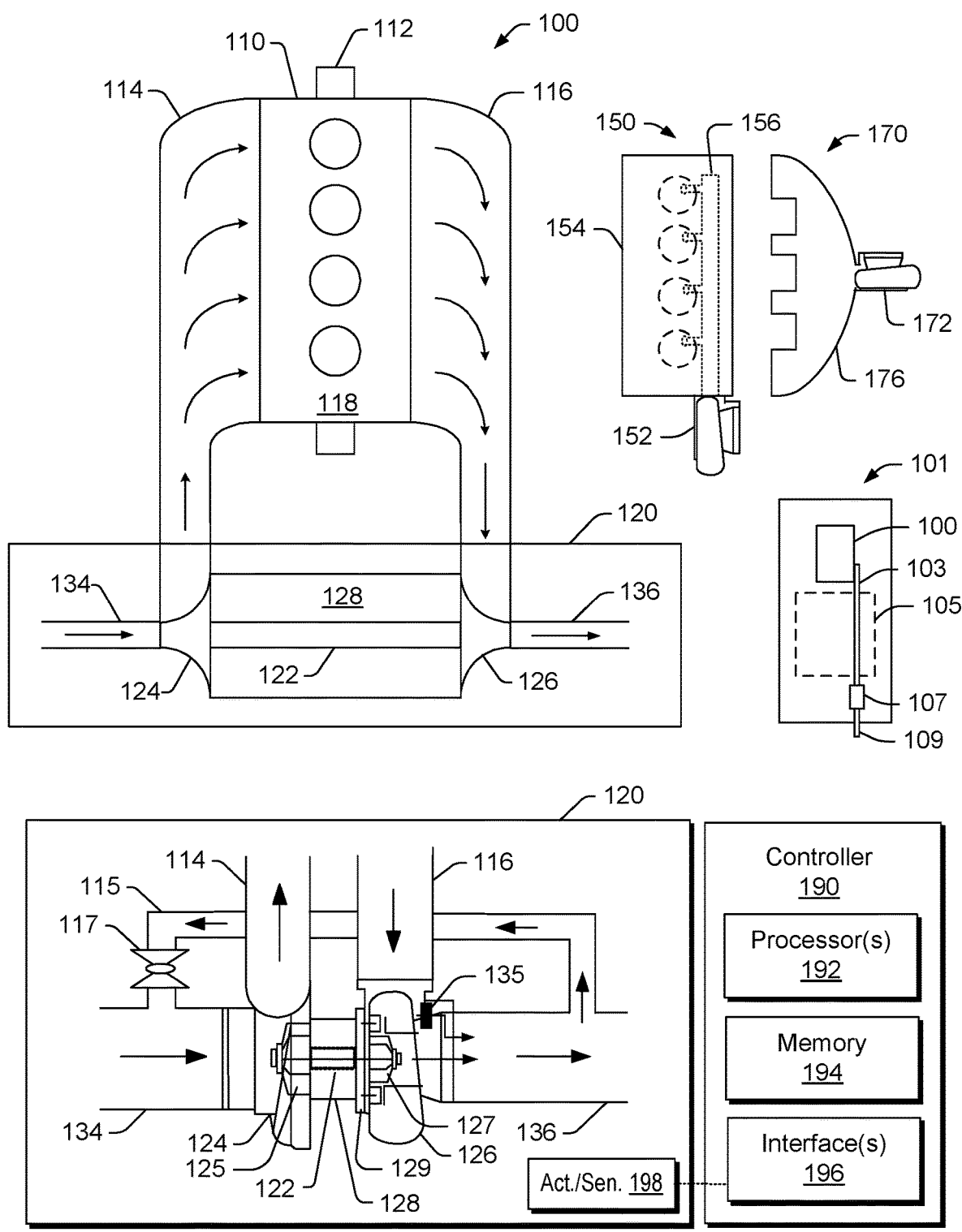
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.). As an example, a silencer such as a muffler may be included that aims to reduce sound emissions. As an example, a combined treatment unit and silencer may be utilized along an exhaust flow path or exhaust flow paths.

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 fora turbine wheel 127, another housing assembly 128 and an exhaust outlet 136. The housing assembly 128 may be referred to as a center housing assembly as it is disposed between the compressor housing assembly 124 and the turbine housing assembly 126.

In the turbocharger 120 of FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
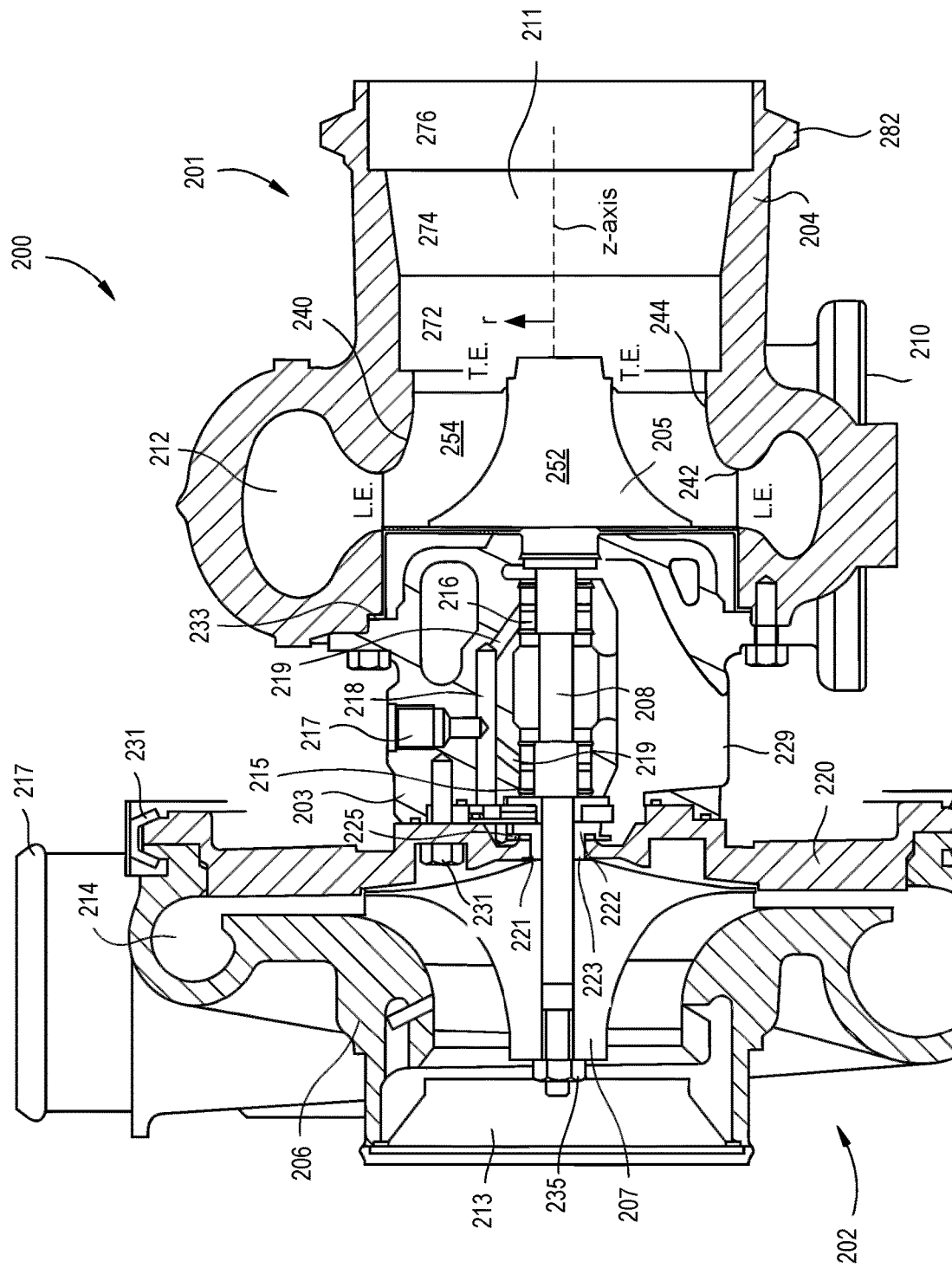
FIG. 2 is a cross-sectional view of an example of a turbocharger.

FIG. 2 shows an example of a turbocharger 200 that includes a turbine assembly 201, a compressor assembly 202 and a center housing 203. The turbine assembly 201 includes a turbine housing 204 that is shaped to accommodate a turbine wheel 205 and the compressor assembly 202 includes a compressor housing 206 that is shaped to accommodate a compressor wheel 207. As shown, a shaft 208 operatively couples the turbine wheel 205 and the compressor wheel 207 as supported by one or more bearings 215 and 216 in a through bore of the center housing 203.

As shown in FIG. 2, the turbine housing 204 can include an exhaust inlet 210 and an exhaust outlet 211 where a volute 212 is defined at least in part by the turbine housing 204. The volute 212 can be referred to as a scroll that decreases in its cross-sectional diameter as it spirals inwardly toward a turbine wheel space that accommodates the turbine wheel 205.

As shown in FIG. 2, the compressor housing 206 can include an air inlet 213 and an air outlet 211 where a volute 214 is defined at least in part by the compressor housing 206. The volute 214 can be referred to as a scroll that increases in its cross-sectional diameter as it spirals outwardly from a compressor wheel space that accommodates the compressor wheel 207.

Disposed between the compressor housing 206 and the center housing 203 is a backplate 220, which includes a bore 221 that can receive a thrust collar 222, which can abut against a base end 223 of the compressor wheel 207. As shown, the thrust collar 222 can include a lubricant slinger 225 that extends radially outward, which can help to reduce undesirable flow of lubricant (e.g., to the compressor wheel space, etc.).

The center housing 203 includes various lubricant features such as a lubricant inlet 217, a lubricant bore 218, lubricant jets 219, and a lubricant drain 229. As shown, lubricant can be provided at the lubricant inlet 217 to flow to the lubricant bore 218 and to the lubricant jets 219, which include a compressor side jet for directing lubricant to the bearing 215 and a turbine side jet for directing lubricant to the bearing 216. Lubricant can carry heat energy away from the bearings 215 and 216 as they rotatably support the shaft 208 as the turbine wheel 205 is driven by flow of exhaust through the turbine housing 204.

As shown in the example of FIG. 2, the compressor housing 206 can be clipped to the backplate 220 via a clip 231, the backplate 220 can be bolted to the center housing 203 via bolt or bolts 232 and the center housing 203 can be bolted to the turbine housing 204 via a bolt or bolts 233; noting that various other techniques may be utilized to couple the components to form a turbocharger.

In the example of FIG. 2, one or more of the housings 203, 204 and 206 may be cast. For example, the turbine housing 204 may be cast from iron, steel, nickel alloy, etc. As an example, consider a Ni-Resist cast iron alloy with a sufficient amount of nickel to produce an austenitic structure. For example, consider nickel being present from approximately 12 percent by weight to approximately 40 percent by weight. As an example, an increased amount of nickel can provide for a reduced coefficient of thermal expansion (e.g., consider a minimum at approximately 35 percent by weight). However, increased nickel content can increase cost of a Ni-Resist material; noting that density tends to be relatively constant over a large range of nickel content (e.g., approximately 7.3 to 7.6 grams per cubic centimeter). The density of Ni-Resist material tends to be approximately 5 percent higher than for gray cast iron and approximately 15 percent lower than cast bronze alloys. As to machinability, Ni-Resist materials tend to be better than cast steels; noting that increased chromium content tends to decrease machinability due to increasing amounts of hard carbides. When compared to stainless steel (e.g., density of approximately 8 grams per cubic centimeter), Ni-Resist materials can be less costly and of lesser mass (e.g., lesser density).

Ni-Resist materials tend to exhibit suitable high temperature properties, which may be at rated to over 480 degrees C. (900 degrees F.). Ni-Resist materials can be suitable for turbocharges for diesel and gasoline internal combustion engines. As an example, a diesel engine can have exhaust that may be at about 860 degrees C. and, as an example, a gasoline engine can have exhaust that may be at about 1050 degrees C. Such exhaust can be received by a turbine assembly that includes a turbine housing made of a suitable material.

As shown, the turbine housing 204 may be a relatively large component when compared to the compressor housing 206 and the center housing 203 such that the mass of the turbine housing 204 contributes significantly to the mass of the turbocharger 200.

In the example of FIG. 2, various components of the turbocharger 200 may be defined with respect to a cylindrical coordinately system that includes a z-axis centered on a through bore of the center housing 203, which can coincide with the rotational axis of a rotating assembly that includes the turbine wheel 205, the compressor wheel 207 and the shaft 208. As mentioned, a turbine wheel may be welded to a shaft to form a shaft and wheel assembly (SWA) and a compressor wheel may be threaded onto an end of a shaft (e.g., a "boreless" compressor wheel) or have a through bore that receives a free end of the shaft where a nut or other suitable component is used to secure the compressor wheel to the shaft. In the example of FIG. 2, the turbine wheel 205 is welded to the shaft 208 and a nut 235 is used to secure the compressor wheel 207 to the shaft 208 and, hence, the turbine wheel 205.

In the example of FIG. 2, a clearance exists between blades 254 that extend from a hub 252 of the turbine wheel 205 and a shroud portion 240 of the turbine housing 204. As shown, the shroud portion 240, in the cross-sectional view is "J" shaped, which can define a body of rotation that has an annular ridge portion 242 and a cylindrical portion 244. As shown, the annular ridge portion 242 can define a nozzle for exhaust that flows from the volute 212 to the turbine wheel space at an inducer portion of the turbine wheel 205, which can be defined by leading edges where each of the blades 254 includes a leading edge (L.E.). As shown, the turbine wheel 205 also includes an exducer portion where each of the blades 254 includes a trailing edge (T.E.). During operation, exhaust flows from the volute 212 via the nozzle defined in part by the annular ridge portion 242 of the shroud portion 240 to the leading edges of the blades 254, along channels defined by adjacent blades 254 of the turbine wheel 205 as confined between the hub 252 and the cylindrical portion 244 of the shroud portion 240 and then to the trailing edges of the blades 254 where the exhaust is confined by a larger diameter cylindrical wall 272, a slightly conical wall 274 and a yet larger diameter cylindrical wall 276. As shown in FIG. 2, the cylindrical wall 276 can be defined by a portion of the turbine housing 204 that includes a fitting such as an annular ridge 282 that can be utilized to secure an exhaust conduit to the turbine housing 204. Such an exhaust conduit may be in fluid communication with one or more other components such as an exhaust treatment unit, a muffler, another turbocharger, etc. As to the exhaust inlet 210 of the turbine housing 204, it too may be shaped to couple to one or more exhaust conduits such as, for example, an exhaust header, an exhaust manifold, another turbine housing (e.g., for a multi-stage turbocharger arrangement), etc.

As shown in FIG. 2, the turbine housing 204 severs various functions through its structural features and shapes thereof; however, such structural features can contribute to mass of the turbocharger.

As an example, a turbocharger may weigh from approximately 4 kilograms (e.g., 8.8 lbs) to approximately 40 kilograms (e.g., 88 lbs) or more.

As mentioned, a turbocharger can be defined with respect to a cylindrical coordinate system where a z-axis may be along a length. In the example of FIG. 2, the length of the turbine housing 204 is over 50 percent of the total length. The overall length or size of a turbocharger can be a factor when installing in an engine compartment of a vehicle as it presents design constraints.

The turbocharger 200 of FIG. 2 can be cooled via one or more media, such as lubricant (e.g., oil), water (e.g., radiator fluid, etc.), and air (e.g., via an environment with ambient air or vehicle engine compartment air).

As to lubricant cooling (e.g., oil, whether natural, synthetic, etc.), some tradeoffs exists. For example, if a carbonaceous lubricant reaches too high of a temperature for too long of a time (e.g., consider a time-temperature dependence), carbonization (e.g., also known as coke formation or "coking"), may occur. Coking can exasperate heat generation and heat retention by any of a variety of mechanisms and, over time, coke deposits can shorten the lifetime of a lubricated bearing system. As an example, coke deposits may cause a reduction in heat transfer and an increase heat generation, which may lead to failure of the bearing system. To overcome coking, a turbocharger may be configured to improve lubricant flow. For example, a pump may pressurize lubricant to increase flow rates to reduce residence time of lubricant in high temperature regions. However, an increase in lubricant pressure can exasperate various types of lubricant leakage issues. For example, an increase in lubricant pressure of a bearing system can result in leakage of lubricant to an exhaust turbine, to an air compressor or both. Escape via an exhaust turbine can lead to observable levels of smoke while escape via an air compressor can lead to lubricant entering an intercooler, combustion chambers (e.g., combustion cylinders), etc.

As to temperatures experienced during operation, they can depend on temperature of exhaust flowing to an exhaust turbine of a turbocharger, which can depend on whether an internal combustion engine is gasoline or diesel fueled (e.g., as mentioned, a diesel engine may have exhaust at about 860 degrees C. and a gasoline engine may have exhaust at about 1050 degrees C.). Also, as to temperature, consider the example arrangements 150 and 170 of FIG. 1 where the turbine housing assemblies 152 and 172 are in close proximity to combustion cylinders, which may result in the turbine housing assemblies 152 and 172 experiencing higher exhaust temperatures and/or higher ambient temperatures.

Figure 3:
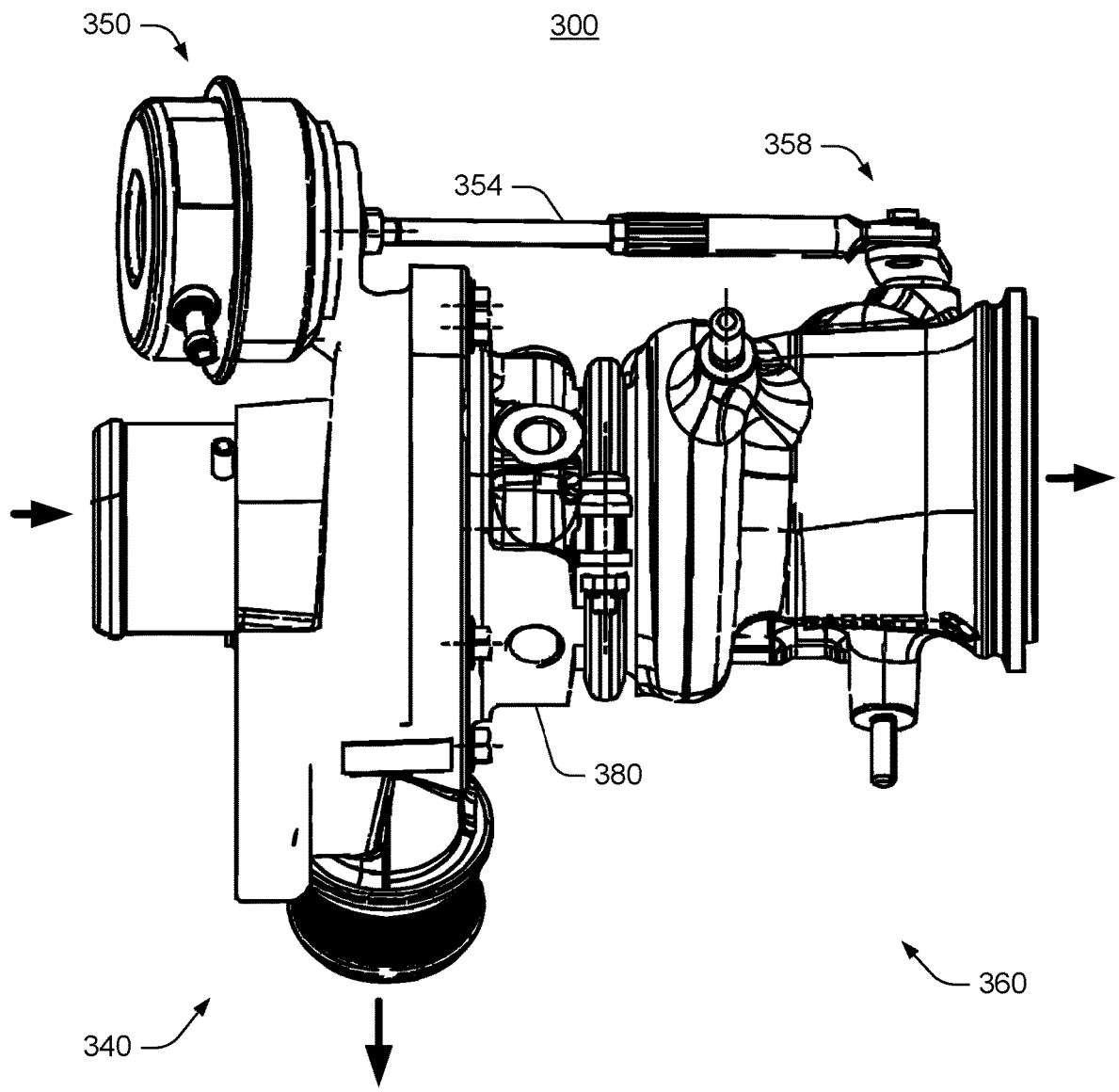
FIG. 3 is a side view of an example of a turbocharger.

FIG. 3 shows an example of a turbocharger 300 that includes a compressor assembly 340 with a compressor housing for a compressor wheel, a turbine assembly 360 with a turbine housing for a turbine wheel, a center housing 380 for a bearing, bearings or a bearing assembly to rotatably support a shaft of a shaft and wheel assembly (SWA), and an actuator 350 with a linkage 354 to a control arm assembly 358 for a wastegate of the turbine assembly 360. The turbocharger 300 can include one or more of the components shown in FIG. 2. In the view of FIG. 3, the exhaust inlet of the turbine assembly 360 is not visible because it is on the opposite side. General directions of flow of air or exhaust are indicated by arrows. The actuator 350 is shown as being mounted to the compressor assembly 340, which can help to reduce temperatures experienced by the actuator 350 (e.g., compared to having the actuator mounted on a turbine housing). The turbocharger 300 can be part of a vehicle such as, for example, the vehicle 101 of FIG. 1. As an example, the turbine assembly 360 may optionally be arranged such as in one of the example arrangements 150 or 170 of FIG. 1.

Figure 4:
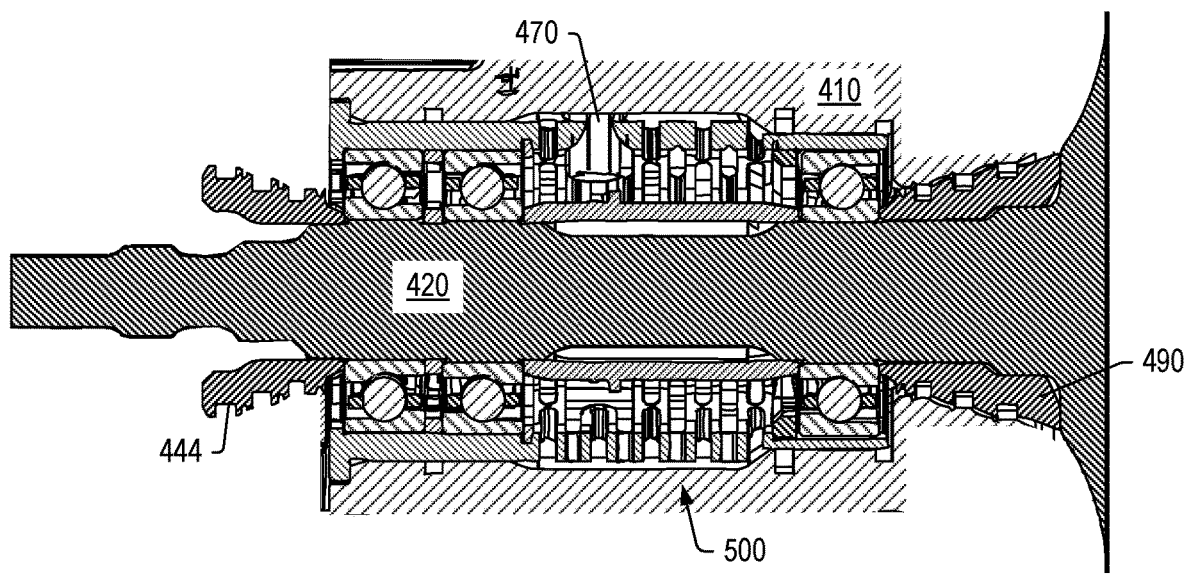
FIG. 4 is a series of cutaway views of examples of assemblies.
Figure 4:
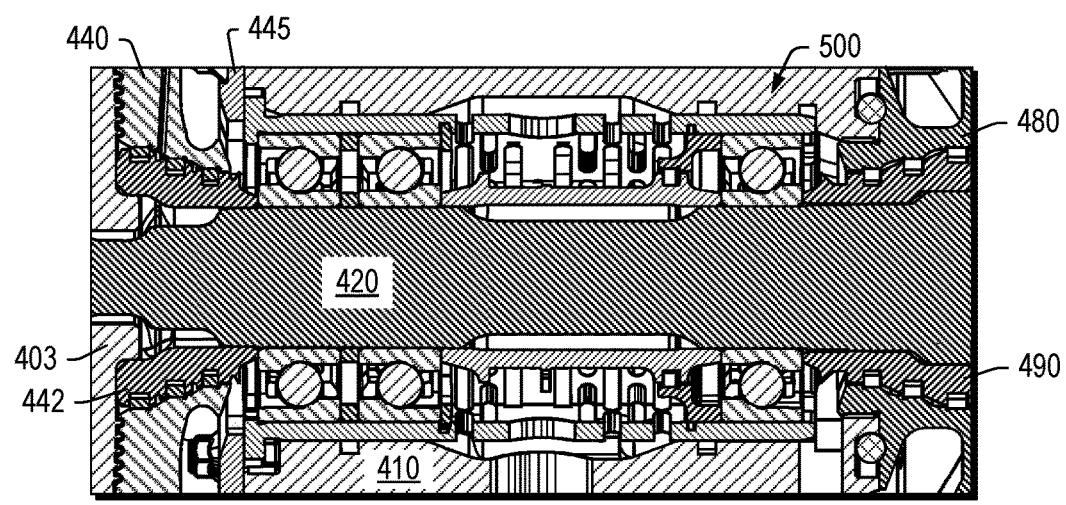

FIG. 4 shows cutaway views of examples of an assembly 400 that includes various components, including a housing 410, a shaft 420, a compressor-side plate 440, a turbine-side plate 480 and a bearing cartridge assembly 500. As shown, the compressor-side plate 440 may be appropriately shaped with appropriate features, for example, to accommodate a compressor wheel 403 and a spacer 444 and/or thrust collars, lubricant slingers, etc. As shown, the turbine-side plate 480 may be appropriately shaped with appropriate features, for example, to define a fluid region (e.g., for a cooling fluid, etc.), to accommodate a turbine wheel as part of a shaft and wheel assembly (SWA), one or more seal element spacers 490 (e.g., piston ring spacers, etc.).

As an example, the assembly 400 may include a speed sensor 470 that is received via a bore in the housing 410 where the speed sensor 470 may extend to or into the bearing cartridge assembly 500.

FIG. 4 also shows an example of a plate 445 that can be utilized to locate the bearing cartridge assembly 500 in the housing 410. As shown, a recess can be provided at a compressor end of the bore of the housing 410 where a portion of the bearing cartridge assembly 500 can be received in the recess where the plate 445 can then be placed over at least part of the portion of the bearing cartridge assembly 500 to thereby axially locate the bearing cartridge assembly 500 in the bore of the housing 410 where radial movement can occur (e.g., consider the bearing cartridge assembly 500 as being supported by a lubricant film, etc.).

As an example, the assembly 400 can include an anti-rotation feature or features that limit rotation of the bearing cartridge assembly 500 in the housing 410 azimuthally about the rotational axis of the shaft 420. For example, the bearing cartridge assembly 500 may include a notch that receives an extension fixed to the housing 410 where the extension contacts notch surfaces to limit rotation while still allowing for radial movement of the bearing cartridge assembly 500 (see, e.g., FIG. 9).

FIG. 5A, FIG. 5B, FIG. 5C, FIG. 5D, FIG. 5E, FIG. 5F and FIG. 5G show a series of cutaway view of an example of the bearing cartridge assembly 500, also referred to as the BC assembly 500 or BCA 500.

Figure 5A:
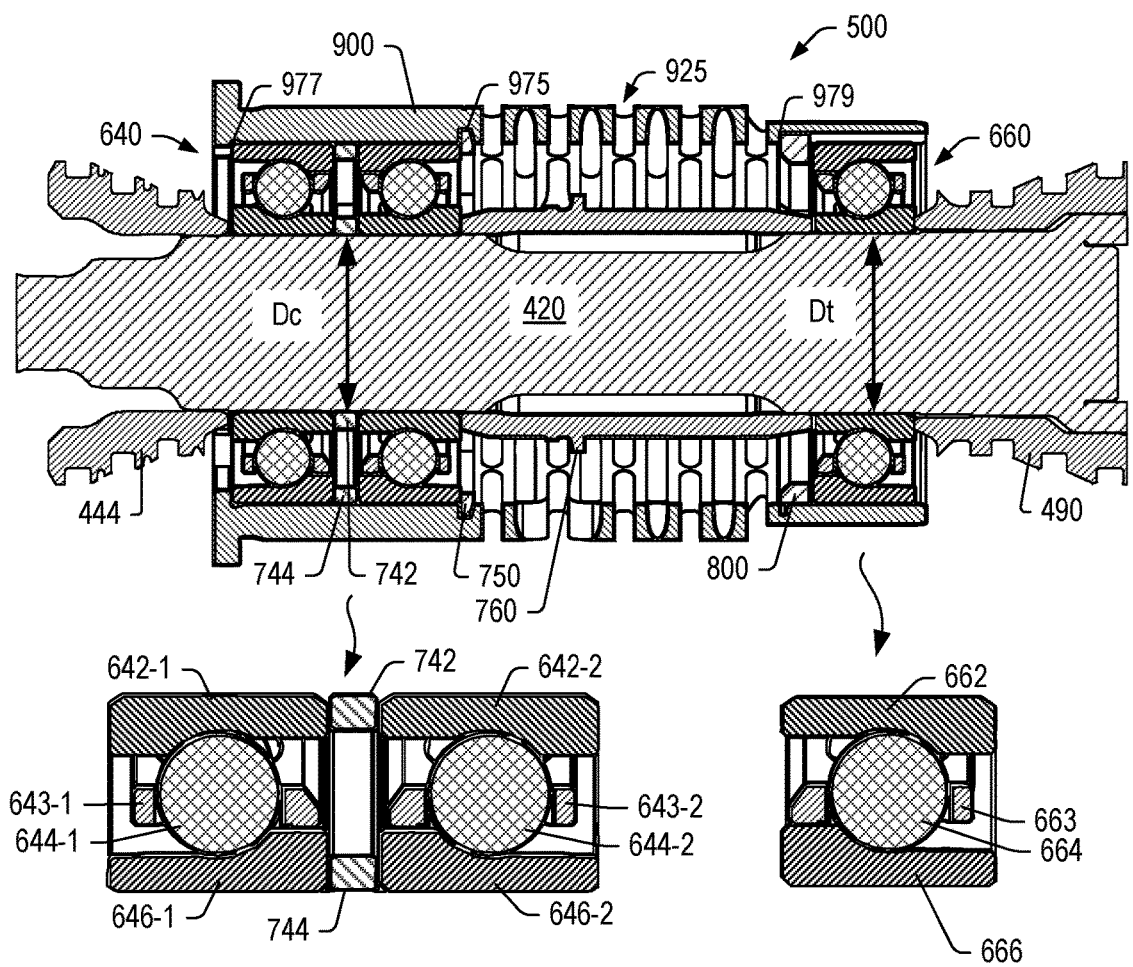
FIG. 5A, FIG. 5B, FIG. 5C, FIG. 5D, FIG. 5E, FIG. 5F and FIG. 5G are cutaway views of an example of an assembly.

In FIG. 5A, the BC assembly 500 is shown along with the shaft 420 and spacers 444 and 490 for a compressor wheel end and a turbine wheel end, respectively. As shown in the example of FIG. 5A, the bearing cartridge assembly 500 includes a flexible shell 900 that can carry a compressor-side bearing assembly 640 (e.g., consider one or more rolling element bearings (REB)) and a turbine-side bearing assembly 660 (e.g., consider one or more REBs). The BC assembly 500 can include components such as one or more spacers 742, 744, 760 and 800; one or more retaining rings 750; etc. As shown in the example of FIG. 5A, the flexible shell can include cutouts 925, which may be referred to as voids that can impart flexibility to the flexible shell 900 (e.g., bendability and spring-like action).

FIG. 5A also shows enlarged views of portions of the compressor-side bearing assembly 640 and the turbine-side bearing assembly 660. As shown, the compressor-side bearing assembly 640 includes inner races 642-1 and 642-2 spaced apart by the spacer 742, outer races 646-1 and 646-2 spaced apart by the spacer 744, which can include lubricant passages and jets, and rolling elements 644-1 and 644-2 that can be supported between the inner races 642-1 and 642-2 and the outer races 646-1 and 646-2 by cages 643-1 and 643-2.

As an example, the compressor-side bearing assembly 640 can be referred to as a multiple REB assembly where one REB assembly is formed by the inner race 642-1, the cage 643-1, the rolling elements 644-1 and the outer race 646-1 and where another REB assembly is formed by the inner race 642-2, the cage 643-2, the rolling elements 644-2 and the outer race 646-2. In such an example, the compressor-side bearing assembly 640 can provide support that exceeds support provided by the turbine-side bearing assembly 660. For example, various operational forces may be predominantly handled by the compressor-side bearing assembly 640.

As shown in FIG. 5A, the turbine-side bearing assembly 660 can include an inner race 662, an outer race 666 and rolling elements 664 that can be supported between the inner race 662 and the outer race 666 by a cage 663. In the example of FIG. 5A, the shaft 420 can include multiple diameters such as a compressor-side bearing assembly diameter Dc and a turbine-side bearing assembly diameter Dt. As an example, the diameters Dc and Dt may differ, for example, Dt may be slightly greater than Dc. As shown in FIG. 5A, the shaft 420 can include an intermediate section with a diameter that is less than Dc and less than Dt.

In the example of FIG. 5A, the outer races 646-1 and 646-2 can be interference fit in the flexible shell 900 and the outer race 666 can be interference fit in the flexible shell 900. Such interference fits can provide for contact between the each of the outer races 646-1, 646-2 and 666 and the flexible shell 900 where the flexible shell 900 can be supported by a lubricant film or lubricant films about its outer surface (e.g., as formed in a radial clearance or radial clearances between the flexible shell 900 and a bore of a housing). As explained, the flexible shell 900 can be bendable where bending may occur responsive to one or more modes as the shaft 420 rotates with respective components mounted thereto (e.g., a rotating assembly). As explained, the flexible shell 900 can also act in a spring-like manner, for example, to apply a pre-load to the outer race 666 of the turbine-side bearing assembly 660. In such an assembled state, forces experienced by the compressor-side bearing assembly 640 may be altered beneficially.

In the example of FIG. 5A, the spacer 742 can be disposed between the inner races 642-1 and 642-2 and the spacer 744 can be disposed between the outer races 646-1 and 646-2. As shown, the retaining ring 750 can be an axial position retention component that is received in an annular notch 975 of the flexible shell 900 (e.g., an annular groove, a shoulder, etc.) to locate the outer races 646-1 and 646-2 of the two REBs of the compressor-side bearing assembly 640 where a shoulder 977 of the flexible shell 900 provides another surface for axial positioning of the outer races 646-1 and 646-2 of the two REBs of the compressor-side bearing assembly 640. As an example, the retaining ring 750 can be beveled to help reduce axial clearance between bearing the outer races 646-1 and 646-2 and the spacer 744 (see also, e.g., FIGS. 5E, 5F and 5G). As shown, the spacer 760 can extend between the inner race 642-2 of the compressor-side bearing assembly 640 and the inner race 662 of the turbine-side bearing assembly 660 and may be referred to as an intermediate spacer.

In the example of FIG. 5A, the spacers 444 and 490 can also contact inner races (e.g., the inner race 642-1 and the inner race 662, respectively). In such an example, an axial stack-up can, from left to right, include the spacer 444, the inner races 642-1 and 642-2 of the compressor-side bearing assembly 640 with the spacer 742 disposed therebetween, the spacer 760, the inner race 662 of the turbine-side bearing assembly 660 and the spacer 490, where, for example, the spacer 490 has a hard stop against a portion of the shaft 420 and/or turbine wheel (e.g., as forming a shaft and wheel assembly (SWA)). The foregoing axial stack-up components can be fit to the shaft 420 such that they rotate with the shaft 420 (e.g., become part of a rotating assembly). For example, consider the axial stack-up components being interference fit to the shaft 420 to be in contact with an outer surface of the shaft 420, which may vary in diameter over an axial length of the shaft 420 (e.g., with one or more regions of constant diameter, transition regions of decreasing and/or increasing diameter, etc.).

Figures 5B, 5C:
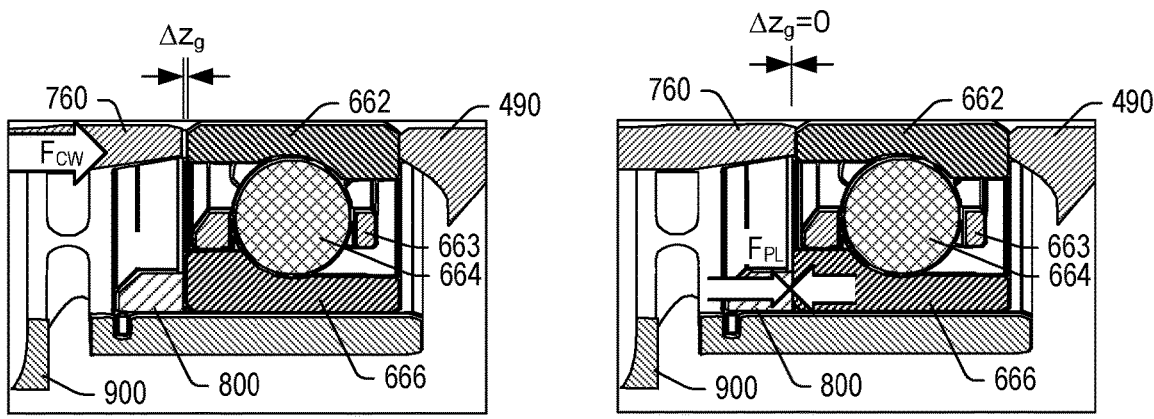

FIG. 5B and FIG. 5C show enlarged views of the turbine-side bearing assembly 660 with respect to application of axial force such that an axial gap ($\Delta z_g$) in an axial stack of components along the shaft 420 can be eliminated to energize the flexible shell 900. In an energized state, the flexible shell 900 can provide a pre-load force with respect to the turbine-side bearing assembly 660.

In the example of FIGS. 5A, 5B and 5C, an axial stack of rotatable components that rotate with the shaft 420 can be compressed by axial force exerted by tightening the compressor wheel 403. For example, a nut may be utilized that includes threads that mate with threads of the shaft 420 such that tightening of the nut applies a compressive force on the compressor wheel 403 that is transmitted along the axial stack. Axial compression permits, due to friction between components, an ability to transfer torque from the turbine wheel to the compressor wheel where via energy extracted from exhaust gas by the turbine wheel generates such torque.

As shown in the enlarged view of FIG. 5B, responsive to tightening of the compressor wheel 403 on the shaft 420 a compressive force ($F_{CW}$) is applied that compresses the inner components that are along the surface of the shaft 420. As shown in the enlarged view of FIG. 5C, the gap ($\Delta z_g$) can be closed such that the spacer 760 can apply force to the inner race 662 of the turbine-side bearing assembly 660, which includes the cage 663 that contains the rolling elements 664 and the outer race 664. As indicated, the flexible shell 900, via spring-like action, can apply a pre-load force ($F_{PL}$) to the spacer 800 where the spacer 800 can contact the outer race 666 to transfer the pre-load force ($F_{PL}$).

As shown in FIG. 5A, the spacer 800 can be seated against a shoulder 979 of the flexible shell 900 such that force can be transferred between the spacer 800 and the flexible shell 900. In the enlarged view of FIG. 5C, the shoulder 800 is not shown, noting that the flexible shell 900 can include a plurality of shoulders such as discrete shoulders that act as stops for the spacer 800; noting that the spacer 800 can also be seen in the examples of FIGS. 11, 12 and 13 where key and keyway features are shown. Thus, in the cutaway view of FIG. 5A, the shoulder 979 can be part of a keyway where a key of the spacer 800 is received in the keyway.

As explained, during assembly, where the BCA 500 is positioned in a center housing of a turbocharger, an amount of compressive force can be applied to the flexible shell 900 to generate a desired pre-load (e.g., pre-load force) for the turbine-side bearing assembly 660.

As an example, a pre-load can be in excess of 100 N, which can depend on size, application, etc. For example, consider compression of the flexible shell 900 by an axial distance of approximately 0.05 mm to approximately 1 mm where the flexible shell 900 generates a force in excess of 100 N (e.g., consider 0.4 mm and 800 N). As an example, a flexible shell may be rated, for example, consider a rating of approximately 0.5 kN per mm to approximately 4 kN per mm of compression (e.g., consider a flexible shell rated at approximately 2 kN per mm where compression is greater than 0.05 mm and less than approximately 1 mm). As an example, a method can include compressing a flexible shell by less than approximately 1 mm to generate a pre-load force. In contrast, where a spring component is utilized rather than a flexible shell, the spring component may have a travel that is in excess of 1 mm, which can be impacted by friction at an outer race.

Figure 5D:
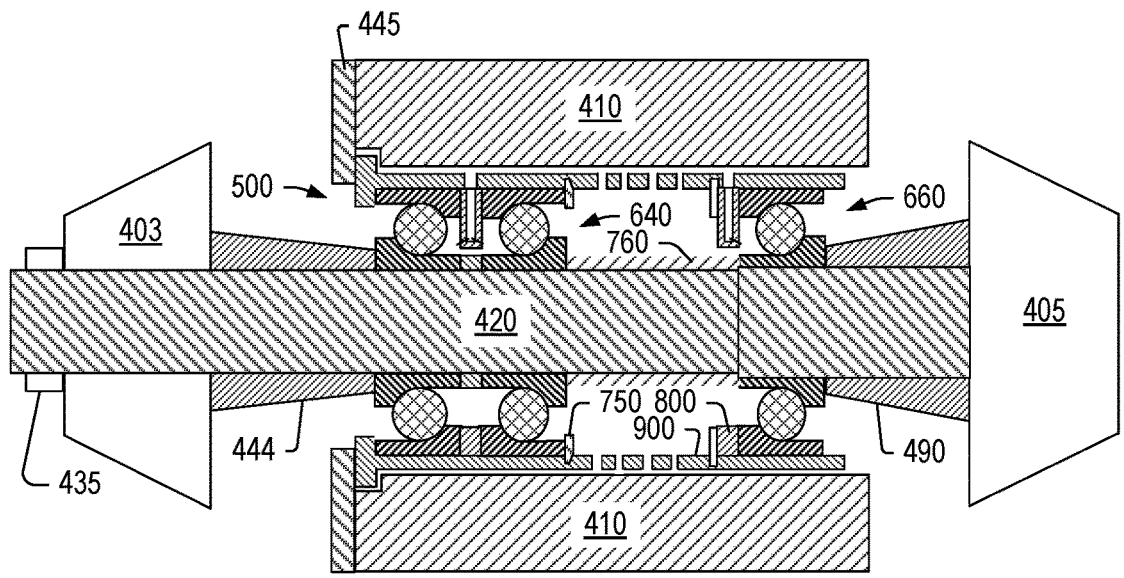
Figure 5E:
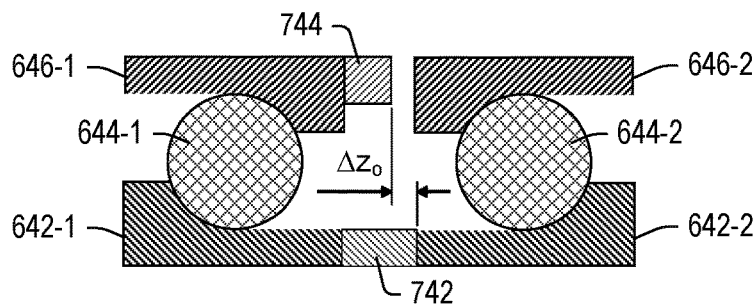
Figure 5F:
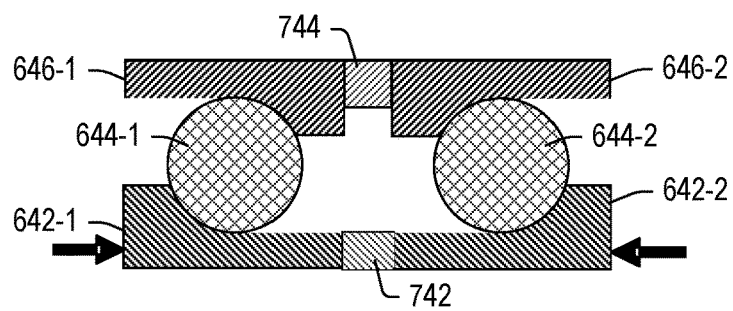
Figure 5G:
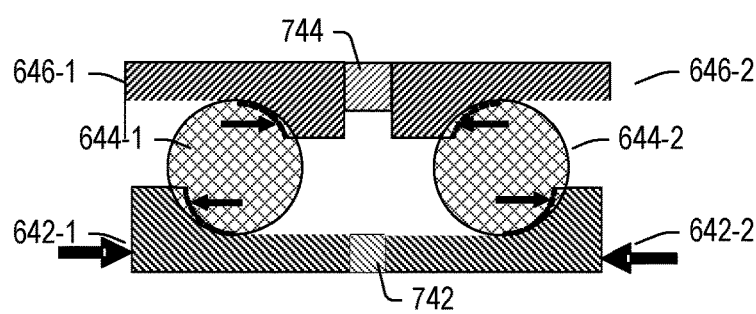

FIG. 5D shows a schematic view of the BC assembly 500 along with the compressor wheel 403, a turbine wheel 405 (e.g., as part of a shaft and wheel assembly (SWA) welded together as a unitary component), the housing 410, the shaft 420 (e.g., as part of the SWA), the plate 445, the spacers 444 and 490, the retaining ring 750 and the spacers 760 and 800. FIGS. 5E, 5F and 5G show schematic views of a portion of the compressor-side bearing assembly 640 with respect to a method of assembly and a method of operation. As an example, a method of compressing a flexible shell to impart a pre-load to a turbine-side bearing assembly can provide for imparting an appropriate pre-load to a compressor-side bearing assembly, which may favorably alter thrust dynamics of the compressor-side bearing assembly. For example, the imparted pre-load can alter internal force distribution and to a certain extent also load capacity of the complete bearing cartridge assembly (BCA).

In the example of FIG. 5E, a different gap ($\Delta z_o$) is illustrated between the spacer 744 (e.g., with a lubricant jet(s)) and the outer race 646-2 as a length of the flexible shell 900 can be longer than an axial stack length of various components as fit to the outer surface of the shaft 420; noting that the spacer 490 contacts a portion of the shaft 420 and/or the turbine wheel 405 to form an axial hard stop. As shown, the spacer 742 can be in contact with the inner races 642-1 and 642-2. In the configuration of FIG. 5E, there is no axial pre-load on the compressor-side bearing assembly 640 (e.g., pre-load is equal to 0 N). As an example, the gap ($\Delta z_o$) may be relatively small (e.g., less than 0.1 mm and greater than 0.001 mm). As an example, the gap ($\Delta z_o$) may be of the order of approximately 0.01 mm plus or minus one order (e.g., 0.001 mm to 0.1 mm).

In the example of FIG. 5F, the gap ($\Delta z_o$) is eliminated such that contact exists between the outer race 646-1 and the spacer 744 and the spacer 744 and the outer race 646-2. For example, as the nut 435 is tightened on the shaft 420 (e.g., via mating threads, etc.), a compressive force is applied to the compressor wheel 403, which is carried by the spacer 444, which is part of the axial stack along the shaft 420 as hard stopped by an end of the spacer 490. In such an example, a clamping load is exerted on the inner races 642-1 and 642-2 and the spacer 742 by tightening the nut 435 such that the spacer 742 and the inner races 642-1 and 642-2 start to compress axially until axial play is removed completely (e.g., the gap ($\Delta z_o$) is closed). In the state of FIG. 5F, the axial pre-load can still be approximatley zero (e.g., pre-load approximatley 0 N). As explained, the spacer 742 can be compressed axially responsive to application of force and, as explained, the gap ($\Delta z_o$) can be relatively small such that a desired amount of axial compression can be accomodated by the spacer 742. As an example, where a compressor wheel is boreless, rotation of the compressor wheel with respect to a shaft may provide for applicaiton of a compressive force.

In the example of FIG. 5G, the clamping load is increased such that it continues to compress the spacer 742 until a desired full clamp load is applied. In such an approach, the pre-load is created internally in the compressor-side bearing assembly 640 where axial bearing play is completely removed. The pre-load can depend on bearing stiffness and compressor spacer length. As explained, the spacer 742 can be further compressed axially responsive to application of force after the gap ($\Delta z_o$) is removed.

As explained, the gap ($\Delta z_g$) along the axial stack along the shaft surface as shown in FIG. 5B can be larger than the gap ($\Delta z_o$) with respect to the outer races 646-1 and 646-2 of the compressor-side bearing assembly 640 as shown in FIG. 5E. As explained, tightening a nut onto a shaft to apply force to a compressor wheel can provide for closing one or more gaps of a bearing cartridge assembly (BCA) such that desirable forces exist within the BCA. In such an example, one gap may be along an inner axial stack fit to a shaft and another gap may be with respect to outer races of a compressor-side bearing assembly.

As explained, a BCA can be supported by a lubricant film or lubricant films within a bore of a housing where the BCA supports a rotating assembly. As an example, a BCA may be located axially in a bore of a housing via a rim where radial movement of the BCA is possible, where such radial movement can be supported by one or more lubricant films. As an example, one or more anti-rotation features may be provided that act to limit rotation of a BCA in a bore of a housing (see, e.g., FIG. 9).

As explained, a flexible shell can be utilized to apply an axial pre-load to a turbine-side bearing assembly (e.g., via tightening a nut on a compressor end of a shaft, etc.). By applying a pre-load to a turbine-side bearing assembly via a flexible shell, thrust dynamics of a compressor-side bearing assembly can be favorably altered. Further, such a flexible shell can also help to retain a bearing assembly or bearing assemblies in a more planar orientation with respect to a rotational axis. For example, a more planar orientation can be defined using a plane where the rotational axis is normal to the plane. In such an example, surfaces (e.g., cylindrical surfaces, etc.) can be more aligned (e.g., more parallel).

Figure 6A:
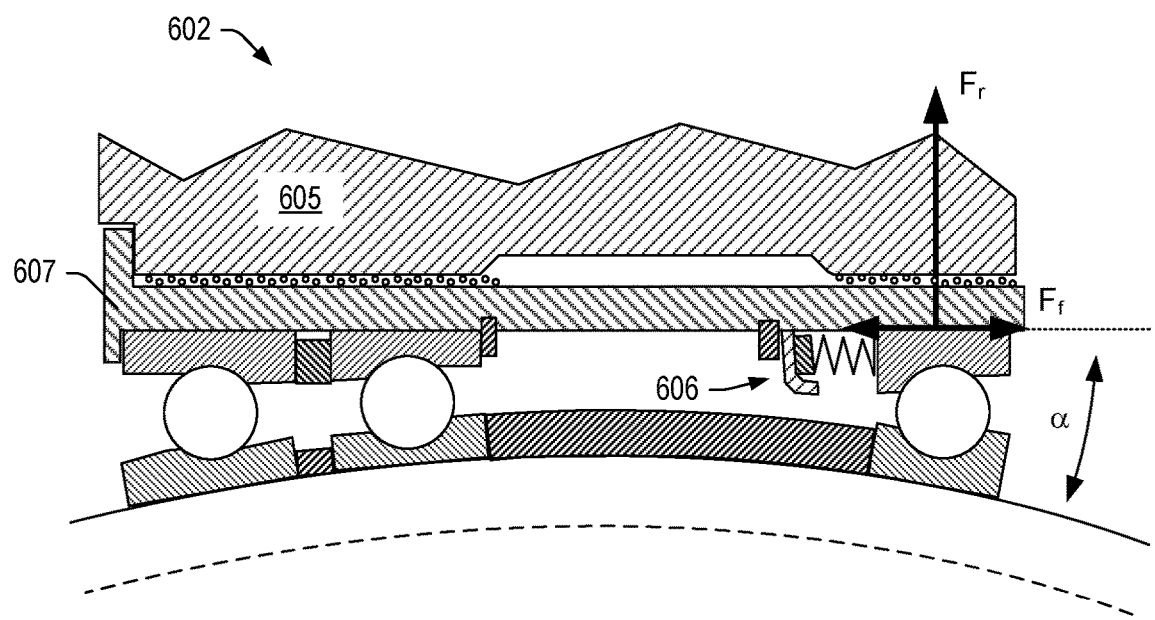
FIG. 6A and FIG. 6B are a series of diagrams illustrating examples of shaft bending and shaft and cartridge bending, respectively.
Figure 6B:
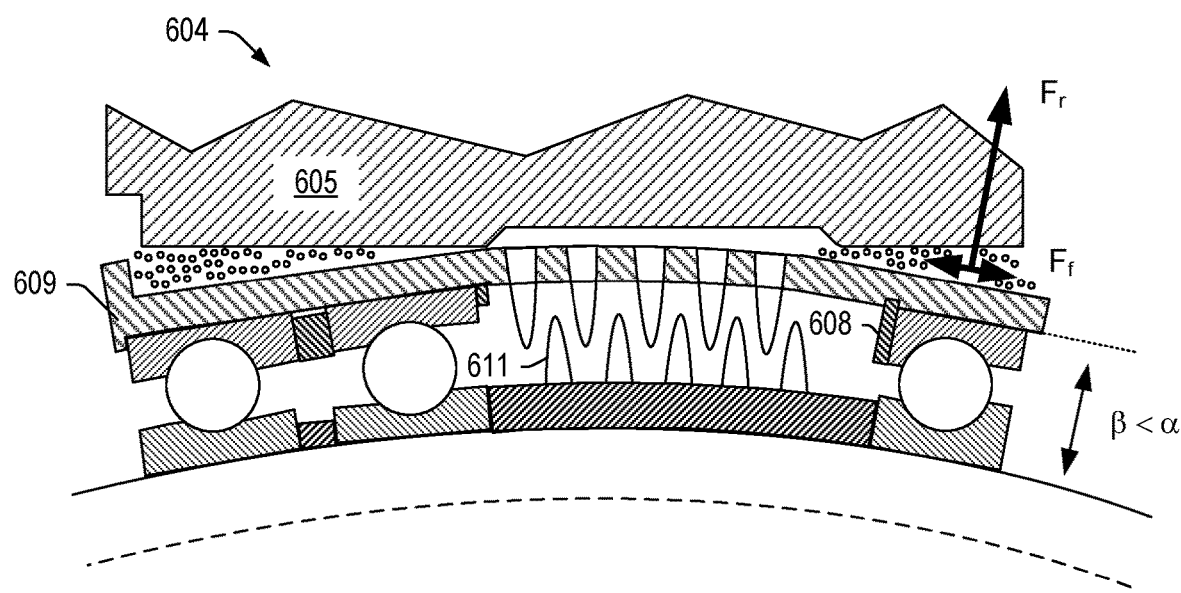

FIG. 6A and FIG. 6B show approximate graphical representations of assemblies 602 and 604 where the assembly 602 includes a stiff shell 607 disposed in a housing 605 and where the assembly 604 includes a flexible shell 609.

As shown in FIG. 6A, the stiff shell 607 can be hydraulically supported via a lubricant layer (e.g., oil, etc.) that can form a squeeze film damper (SFD). As an example, a SFD can provide damping that can help to mitigate vibration caused by factors such as rotor unbalance masses and external loads such as engine vibrations transmitted to turbocharger. In such an example, the damping can help to reduce risk of damage, reduce wear, reduce noise, reduce contact and/or contact force, etc. A SFD can be provided as a film layer between one or more surfaces a shell and one or more surfaces of a housing that define a bore (e.g., a through bore, etc.). In such an example, the film layer can effectively "soften" a component's approach to one or more housing surfaces to increase damping effectiveness. A SFD can include a film or films that are additional to one or more hydrodynamic films that may be provided at surfaces of an annular, ring bearing element, noting that rolling elements of rolling element bearings, etc., may be lubricated via a lubricant (e.g., oil, etc.).

As an example, a shell supported by a SFD may be amenable to some amount of radial movement within a bore of a housing. For example, the stiff shell 607 and the flexible shell 609 can move in one or more radial directions in the bore of the housing 605 (e.g., up, down, side-to-side, etc.). As an example, a shell may be a floating shell or a semi-floating shell where a semi-floating shell can be limited in axial movement by being axially located, etc. (e.g., via contact with one or more other components, etc.).

During operation, a shaft can exhibit one or more bending modes. An article by Liu et al. Dynamic Behaviour Analysis of Turbocharger Rotor-Shaft System in Thermal Environment Based on Finite Element Method. Shock and Vibration. 2020, pp. 1-18 (10.1155/2020/8888504) is incorporated by reference herein. The article by Liu et al. provides a finite element method study on operation of a high-speed rotating rotor-bearing system and internal damping of its materials. In particular, dynamic behaviors of a rotor-shaft system with internal damping composite materials under the action of a temperature field are analyzed where the temperature field increases tangential force generated by internal damping of composite material in a manner that increases with rotor speed, which can destabilize a rotor-shaft system. Analyses involve modal damping coefficient, stability limit speed, and unbalance response where results predict internal damping energy dissipation in a temperature field for prediction of rotor dynamic performance. The article by Liu et al. provides an equation of motion of a rotor-bearing system:

$$M\ddot{q}(t)+C\dot{q}(t)+Kq(t)=f(t)$$

where q is a global force vector, M is a mass matrix, C is a damping matrix and K is a stiffness matrix, which includes a bending matrix.

As explained, during operation shaft bending can occur, which may be understood via actual operation and/or via numerical modeling. Shaft bending can depend on various factors (e.g., geometry, speed, temperature, material properties, etc.).

In FIG. 6A, the stiff shell 607 (e.g., a rigid carrier) cannot accommodate shaft bending (e.g., shaft flexure), as indicated by an angle a, which is exaggerated for purposes of illustration. As shown by force arrows, a radial force ($F_r$) is shown, which can represent some amount of shaft unbalance and where friction force ($F_f$) can be limiting (e.g., reducing) spring pre-load of a spring element 606 that applies force to an outer race of a turbine-side bearing assembly. As shown in FIG. 6A, as the inner races of the bearing assemblies are fit to the shaft, they can become misaligned with respect to their corresponding outer races because the stiff shell 607 does not accommodate spatial changes resulting from shaft bending. In FIG. 6A, the outer race of the turbine-side bearing assembly is not interference fit in the stiff shell 607 as the spring 606 has to be able to apply a force that is expected to be greater than friction force ($F_f$) that may occur between the outer race and the inner surface of the stiff shell 607 (e.g., some axial movement of the turbine side outer race is expected and hence some amount of radial clearance is provided).

As shown in FIG. 6A, the stiff shell 607 can be formed as a solid cylindrical component and/or can be formed from a material that is stiff. In contrast, as shown in FIG. 6B, the flexible shell 609 can be formed with features that provide for bendability and/or can be formed from a material that is of a lesser stiffness than material of the stiff shell 607. In the example of FIG. 6B, the flexible shell 609 can include voids 611 (e.g., cutouts), which may be machined-voids, cast voids, etc. As shown, the voids 611 can be provided in series and/or in sets such that stiffness is reduced as to bendability. As an example, voids may provide for a reduction in mass, expose more surface area, etc. Such void-related properties may provide for one or more performance benefits. For example, consider lesser mass as providing for a lighter turbocharger and/or lesser thermal mass. As to increased surface area, consider, for example, improved thermal energy transfer, improved flow of fluid, etc. As an example, a void pattern may be tailored for purposes of thermal expansion and/or contraction. As an example, a void pattern may be tailored as to bendability and optionally compressibility and/or expandability, for example, axially and/or radially, which may be characterized via a ratio that may be akin to a Poisson ratio.

As explained with respect to the BCA 500, given the spacer 800, which can be received in a groove of the flexible shell 900 (e.g., in a key/keyway manner, etc.), the portion of the flexible shell 900 that includes the cutouts 925 (e.g., voids) can be utilized to apply a pre-load to the outer race of a turbine-side bearing assembly (e.g., along with bendability). Such an approach can be implemented without using a spring element such as the spring element 606 as shown in FIG. 6A. As mentioned, the outer race of a turbine-side bearing assembly can be interference fit in a flexible shell. As indicated in FIG. 6B, friction force is shown as being between an outer surface of the flexible shell 900 and a bore wall surface of a bore of the housing 605 where a clearance therebetween provides for lubricant film formation. The presence of a lubricant film in such a location can reduce impact of movements and/or friction. As explained with respect to FIG. 6A, contact due to spring action of the spring element 606 can cause wear, sticking, etc.; whereas, in FIG. 6B, the outer race of the turbine-side bearing assembly is interference fit and expected to be static such that movement that may cause wear does not occur.

As explained, by compressing inner components of an axial stack via tightening of a compressor wheel on a shaft, a flexible shell can impart a pre-load to an outer race of a turbine-side bearing assembly. In such an example, a spacer can be set axially within a groove of a flexible shell such that, as the flexible shell is compressed via compression of the inner components of the axial stack, the flexible shell is energized to impart a pre-load to the outer race of the turbine-side bearing assembly via the spacer.

As explained, in FIG. 6B, the flexible shell 609 has a reduced bending stiffness compared to the stiff shell 607. With bendability, the outer races of one or more of the bearing assemblies can be more aligned with respect to one or more corresponding inner races. As to the angle α, the undesired internal bearing tilt can be reduced as indicated by an angle β such that the outer race and inner race of a bearing assembly can remain suitably aligned with each shaft revolution (e.g., substantially parallel, etc.).

As explained, potentially inconsistent turbine bearing pre-load at operating conditions can occur due to friction between an outer race (e.g., outer ring) and a shell (e.g., a cartridge body) where spring pre-load sliding contact exists. Issues can occur, for example, for relatively high bearing tilt angle due to rotor bending (e.g., shaft flexure) or due to high radial loads resulting in high friction between turbine bearing outer race and inner bore of the shell at operating conditions. As explained, a flexible shell may be utilized for axial pre-load of rolling element bearing arranged in the flexible shell (e.g., a bearing cartridge) where the flexible shell can be or include one or more elastic elements. In such an example, friction contact between an outer race and the flexible shell can be reduced or removed completely and, as explained, bearing tilt (e.g., inner race with respect to outer race) can be reduced due to reduced bending stiffness of the flexible shell as the flexible shell can better follow rotor bending (e.g., shaft bending).

As an example, a flexible shell may be made of a material such as steel, titanium, etc. As to titanium, it may reduce mass and provide a lower Young's modulus compared to steel. The Young's modulus of titanium can be approximately 100 GPa while super stainless steel (austenitic) can be approximately 200 GPa. Iron can be approximately 192 GPa, SUS 304 approximately 199 GPa, SSS (ferrite) approximately 215 GPa, aluminum approximately 69 GPa, HASTELLOY C approximately 205, and copper approximately 117 GPa.

Figure 7:
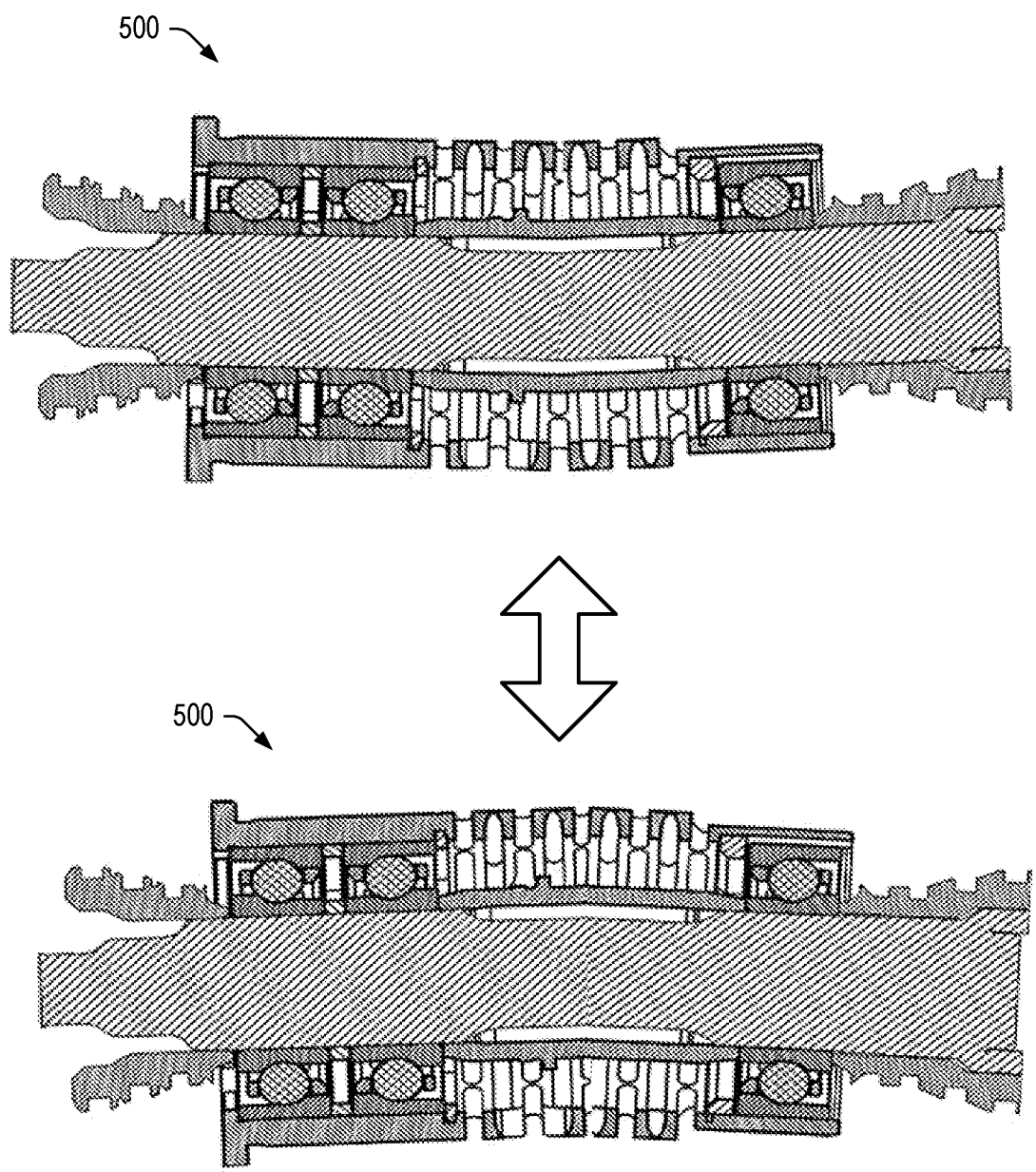
FIG. 7 is a series of diagrams illustrating examples of shaft and cartridge bending.

FIG. 7 shows approximate cutaway views of the BCA 500 with some amount of bending that may correspond to one or more bending modes of a shaft.

Figure 8:
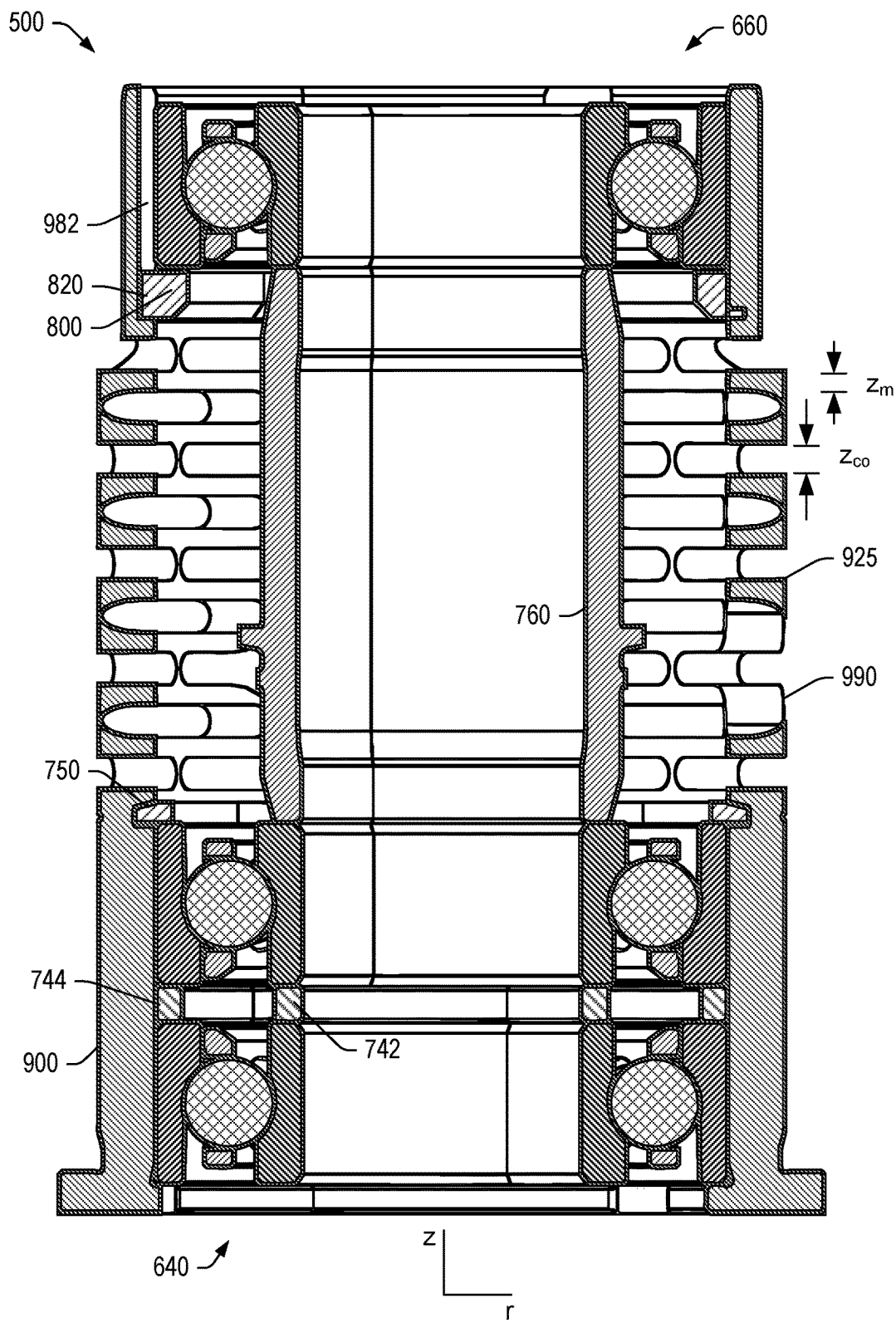
FIG. 8 is a cutaway view of an example of a flexible cartridge assembly.

FIG. 8 shows a cutaway view of an example of the BCA 500 where the flexible shell 900 can include an opening 990 for insertion of a portion of a sensor (e.g., a speed sensor opening for a speed sensor, etc.). In the example of FIG. 8, the flexible shell 900 can include a keyway 982 that can receive a key 820 of the spacer 800 where the key 820 and the keyway 982 can be anti-rotation features as well as axially locating 800 the turbine side bearing outer race in the shell 900 and acting also to azimuthally locate the spacer 800 in the flexible shell 900.

In the example of FIG. 8, the flexible shell 900 is shown as including the cutouts 925 as a series of sets of the cutouts 925. For example, consider a series of at least three sets of the cutouts 925. In the example of FIG. 8, a series of nine sets of the cutouts 925 is shown where each set includes six cutouts, which are shown as arced slots (e.g., arc-shaped cutouts) with rounded ends. In such an example, adjacent arced slots in a set are spaced by material where the material can be defined by an arc span that is less than an arc span of one of the arced slots. In such an example, a set of cutouts can be defined using an axial dimension (see, e.g., $z_{co}$) and an azimuthal dimension (e.g., a number of degrees) according to a cylindrical coordinate system (z, r and Θ) with an axis along a central longitudinal axis of a flexible shell, which corresponds to a rotational axis of a shaft (e.g., a rotating assembly). A series of cutouts can be spaced by a ring of material of a flexible shell where, for example, the ring of material can be defined via an axial dimension (see, e.g., $z_m$). In the example of FIG. 8, each of the cutouts 925 are shown to have an axial dimension ($z_{co}$) that is greater than an axial dimension ($z_m$) of a ring of material that separates sets of the cutouts 925 in the series. In the example of FIG. 8, where each set of the cutouts 925 includes six cutouts, an arc span of each of the cutouts 925 in a set can be less than approximately 60 degrees, for example, consider a range from approximately 30 degrees to approximately 59 degrees (e.g., where material spaces adjacent cutouts apart by approximately 30 degrees to approximately 1 degree). As an example, while six is mentioned, fewer or more cutouts may be utilized for a set. As an example, various dimensions, along with number of series of sets of cutouts, may be tailored to provide desirable bendability and spring-like action of a flexible shell. As shown, the opening 990 may be formed via connecting a number of the cutouts 925 (e.g., from two or more series).

Figure 9:
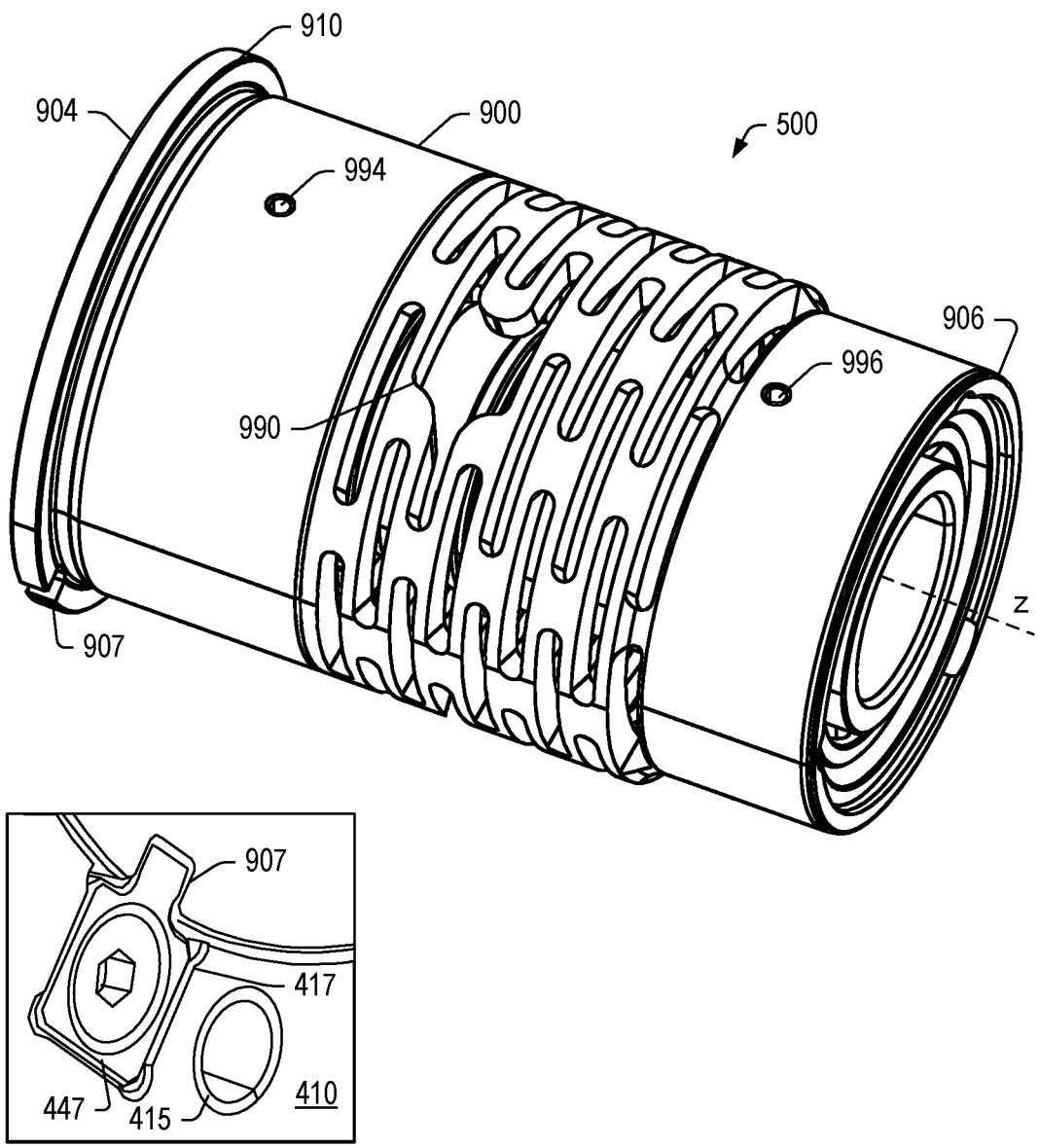
FIG. 9 is a perspective view of an example of a flexible cartridge assembly along with a perspective view of an example of an anti-rotation mechanism.

FIG. 9 shows a perspective view of an example of the BCA 500 where the flexible shell 900 can include a rim 910 to axially locate bearing cartridge within housing and one or more lubricant openings 994 and 996, where the lubricant opening 994 can be a compressor-side lubricant opening for lubricating portions of the compressor-side bearing assembly 640 and where the lubricant opening 996 can be a turbine-side lubricant opening for lubricating portions of the turbine-side bearing assembly 660.

As shown in FIG. 9, the flexible shell 900 can include a notch 907 as an anti-rotation mechanism feature. In such an example, the housing 410 can include a recess 417 that receives a key 447 that can be received in the notch 907 (e.g., a keyway) such that rotation of the flexible shell 900 is limited in the housing 410. As shown, the housing 410 can include one or more sockets 415 that can be suitable for receiving bolts, etc., for example, to secure the plate 445 (see, e.g., FIG. 4). As the flexible shell 900 can "float" on a lubricant film, some amount of radial movement is provided (e.g., via one or more clearances) while axial and azimuthal movements can be limited (e.g., via a key/keyway, via a plate, etc.). As shown in FIG. 4, the plate 445 can act to limit axial movement of the flexible shell 900 (e.g., via the rim 910 as received in a recess of the housing 410).

As explained, a bearing cartridge assembly and rotor assembly can be held by a rim of a flexible shell that is axially restrained between a housing and a plate. Such an arrangement can help to limit the effect of axial thermal expansion (e.g., as the rim can be relatively thin axially such as less than 10 percent of a length of a flexible shell). Such an arrangement can help to keep minimum axial play while the bearing cartridge assembly can thermally expand axially on its own.

Figure 10:
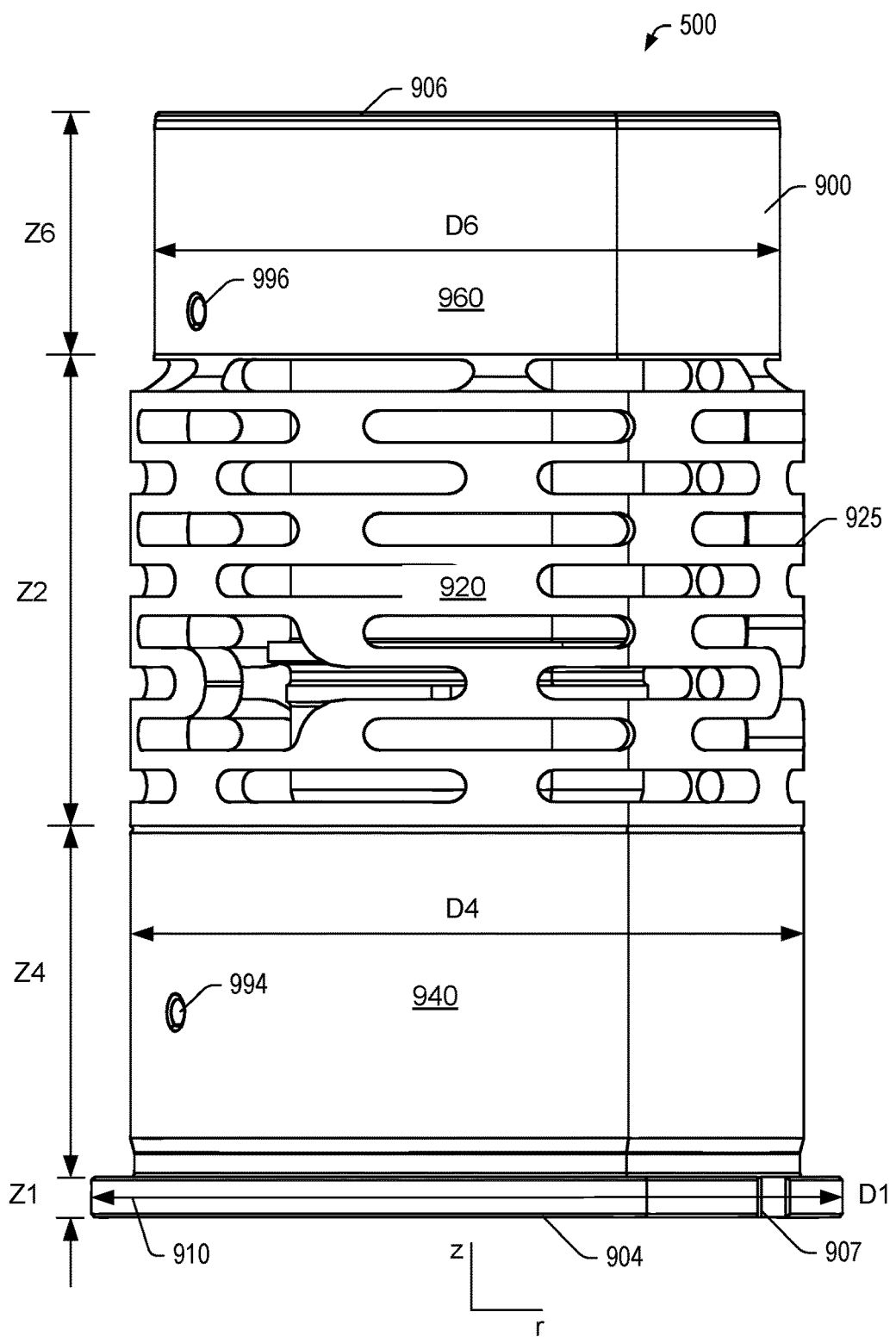
FIG. 10 is a side view of an example of a flexible cartridge assembly.

FIG. 10 shows a side view of an example of the BCA 500 as including the flexible shell 900, which includes a compressor-side end 904, a turbine-side end 906 and, disposed between the ends 904 and 906, a flexible portion 920 that is disposed between a compressor-side portion 940 and a turbine-side portion 960. In the example of FIG. 10, the flexible portion 920 includes the cutouts 925, which may be shaped as curved slots that can be defined by a width or widths and an arc length or lengths, which may be specified at least in part in terms of degrees about a central axis of the shell 900.

In the example of FIG. 10, the compressor-side portion 940 has an outer diameter D4 and the turbine-side portion 960 has an outer diameter D6 where D4 is greater than D6. As shown, the flexible portion 920 may have an outer diameter that is approximately equal to D4 such that a transition occurs as a step down from D4 to D6 at a turbine-side end of the flexible portion 920. As shown, the flexible portion 920 can have an axial length Z2, which can be greater than an axial length Z4 of the compressor-side portion 940 and which can be greater than an axial length Z6 of the turbine-side portion 960. As shown, the rim 910 can be defined by an outer diameter D1 and an axial length Z1, where D1 exceeds D4 and where Z1 is about 1/30$^{th}$ of the total length of the flexible shell 900. As an example, Z1 may be about 1/10$^{th}$ to about 1/40$^{th}$ of the total length of the flexible shell 900 (e.g., approximately 10 percent to approximately 2.5 percent).

As shown in FIG. 10, the compressor-side portion 940 can include a squeeze film damper outer surface with the diameter D4 and the turbine-side portion 960 can include a squeeze film damper outer surface with the diameter D6.

Figure 11:
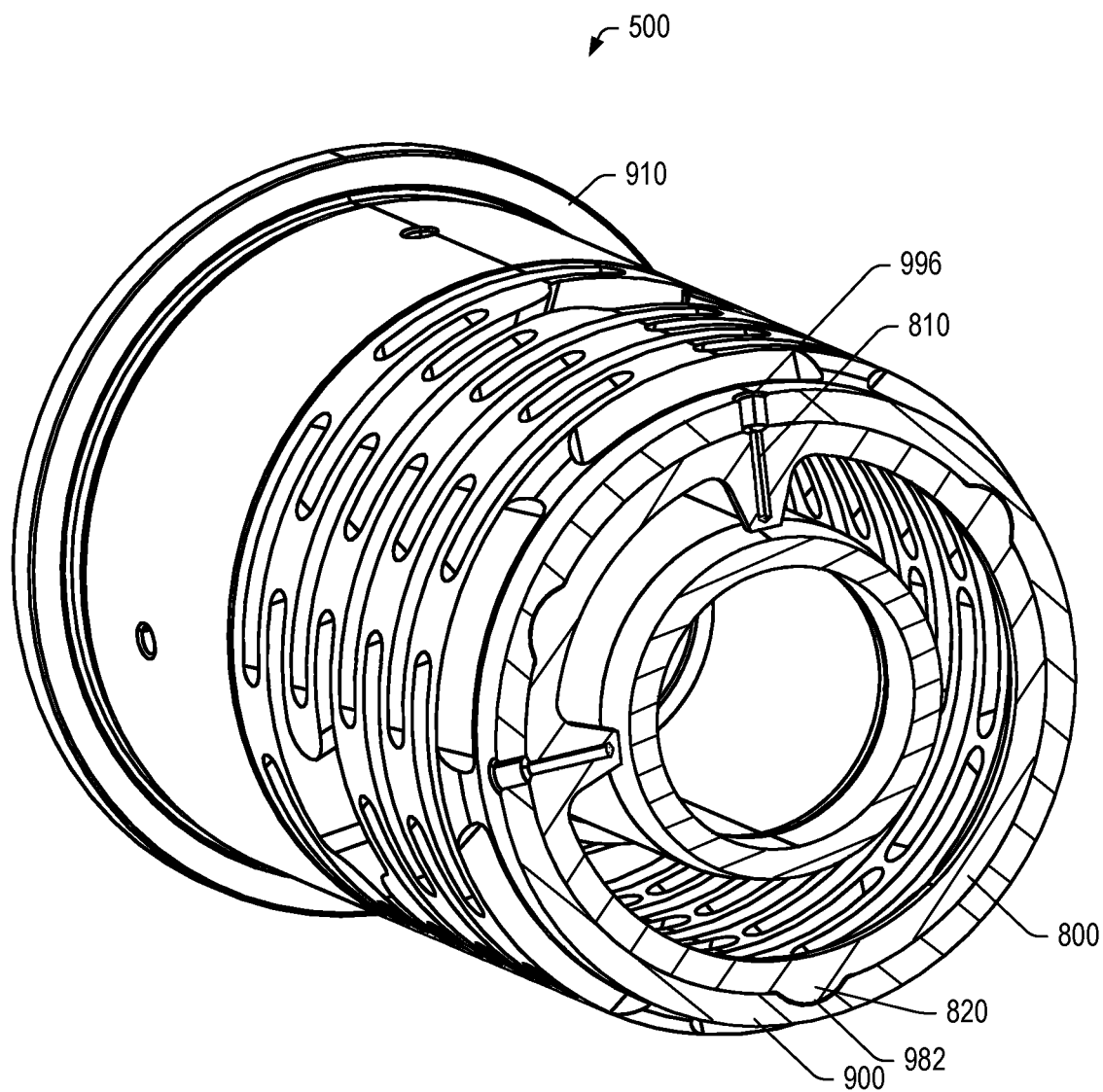
FIG. 11 is a cutaway view of an example of a flexible cartridge assembly.

FIG. 11 shows a perspective cutaway view of an example of the BCA 500 where the spacer 800. As shown, the spacer 800 can include one or more lubricant passages 810 that can be in fluid communication with one or more lubricant openings 996 of the turbine-side portion 960 of the flexible shell 900.

As shown in FIG. 11, the spacer 800 can include one or more lobes as keys 820 that can be disposed in one or more lobe recesses as keyways 982 of the flexible shell 900. In such an example, the one or more lobes as keys 820 and the one or more lobe recesses as keyways 982 may operate as key-keyway pairs that can help to assure proper orientation of the spacer 800 with respect to the one or more lubricant openings 996 of the turbine-side portion 960 of the flexible shell 900. For example, an odd or otherwise asymmetric arrangement of key-keyway features may provide for properly alignment of the one or more lubricant openings 996 and the one or more lubricant passages 810. As an example, a key-keyway arrangement may provide for anti-rotation such that, for example, the spacer 800 does not rotate with respect to the flexible shell 900. As explained, a key-keyway arrangement may be utilized to align various lubricant features (e.g., lubricant feeds to lubricant jet passages, etc.).

Figure 12:
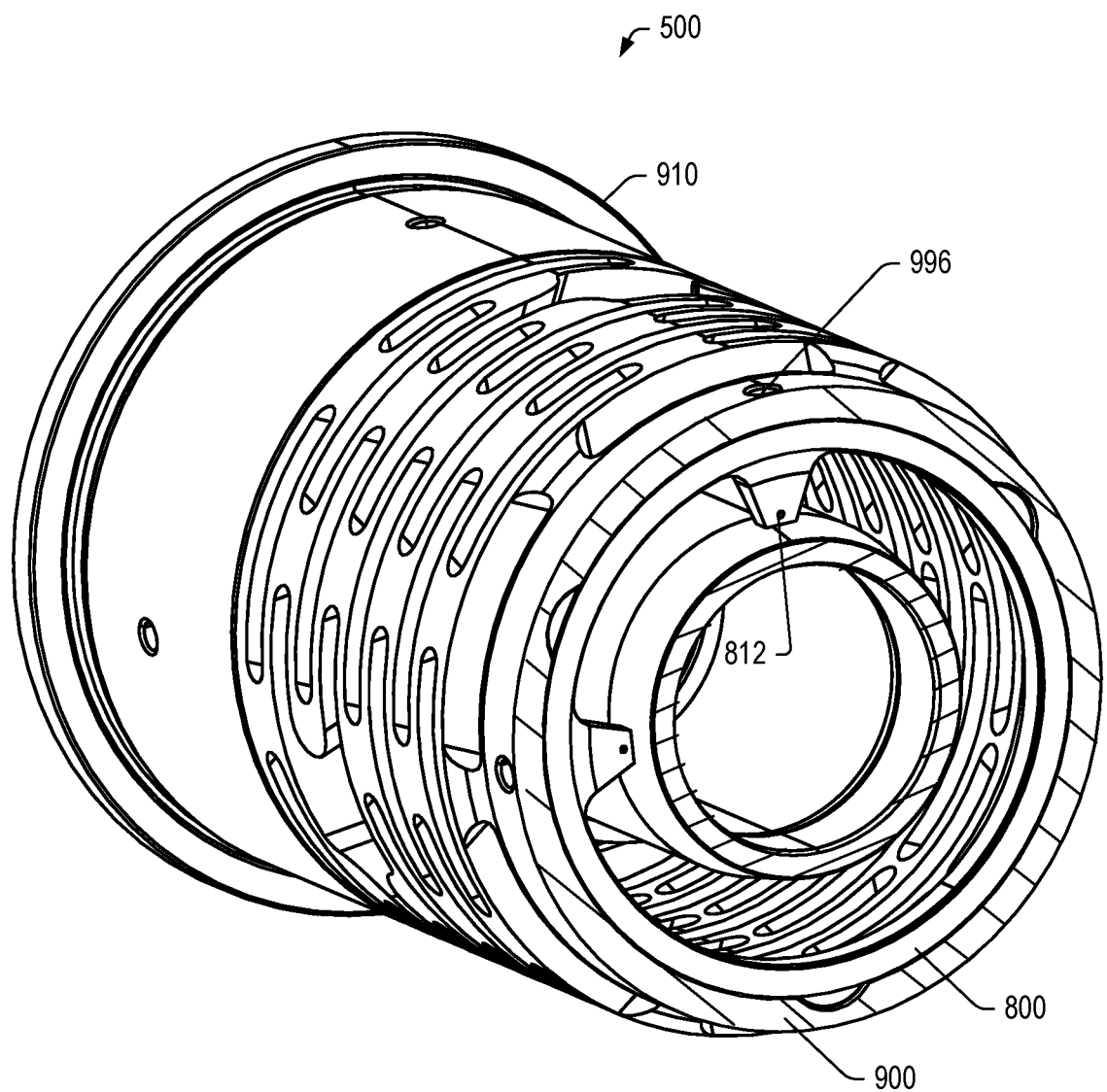
FIG. 12 is a cutaway view of an example of a flexible cartridge assembly.

FIG. 12 shows another perspective cutaway view of an example of the BCA 500 where one or more lubricant jets 812 are shown, which can be in fluid communication with one or more of the one or more lubricant passages 810 of the spacer 800. In such an example, lubricant can be appropriately directed to one or more rolling elements of one or more bearing assemblies (e.g., consider the bearing assembly 460). In such an example, flow may be directed substantially radially and then at least in part axially toward one or more rolling elements.

Figure 13:
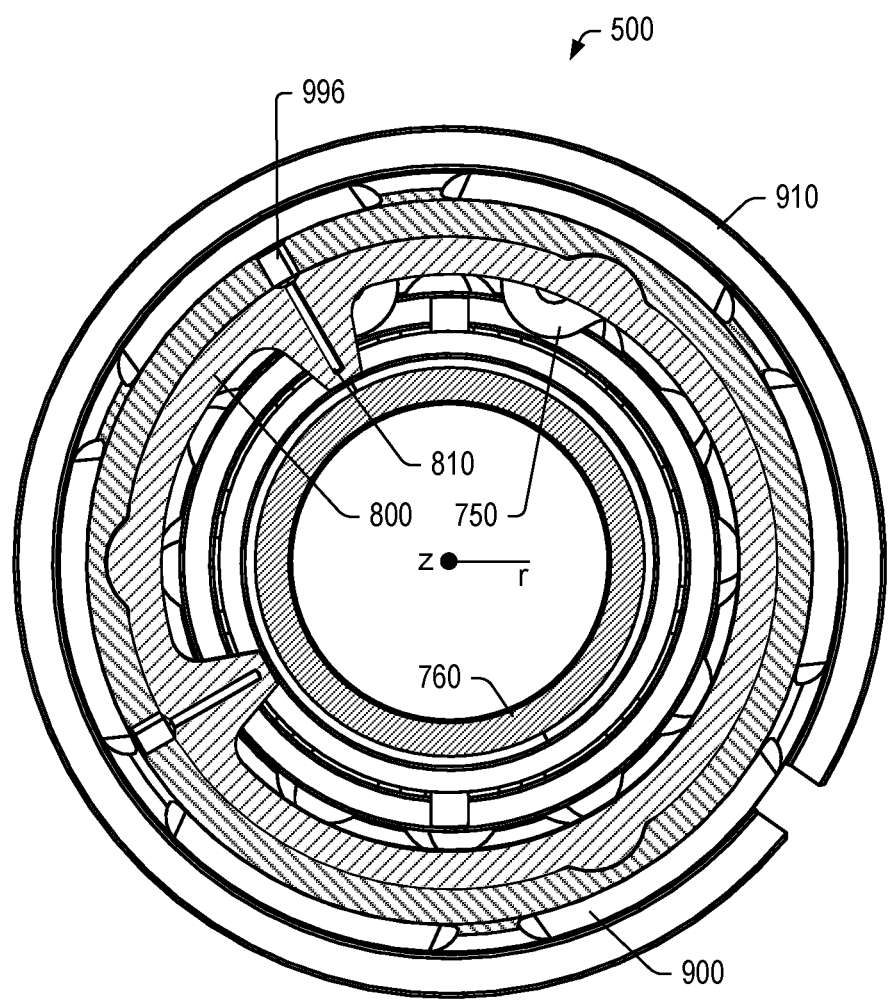
FIG. 13 is a cutaway view of an example of a flexible cartridge assembly.

FIG. 13 shows an end view of an example of the BCA 500 where a portion of the spacer 750 is visible and the spacer 760 is visible, in cross-section. As shown, the spacer 750 may be less than a full ring and may be shaped as a C-ring with end portions that can be brought toward each other to diminish the diameter of the spacer 750 (e.g., a beveled retaining ring) for purposes of installation (e.g., receipt by an annular groove of the flexible shell 900).

Figure 14:
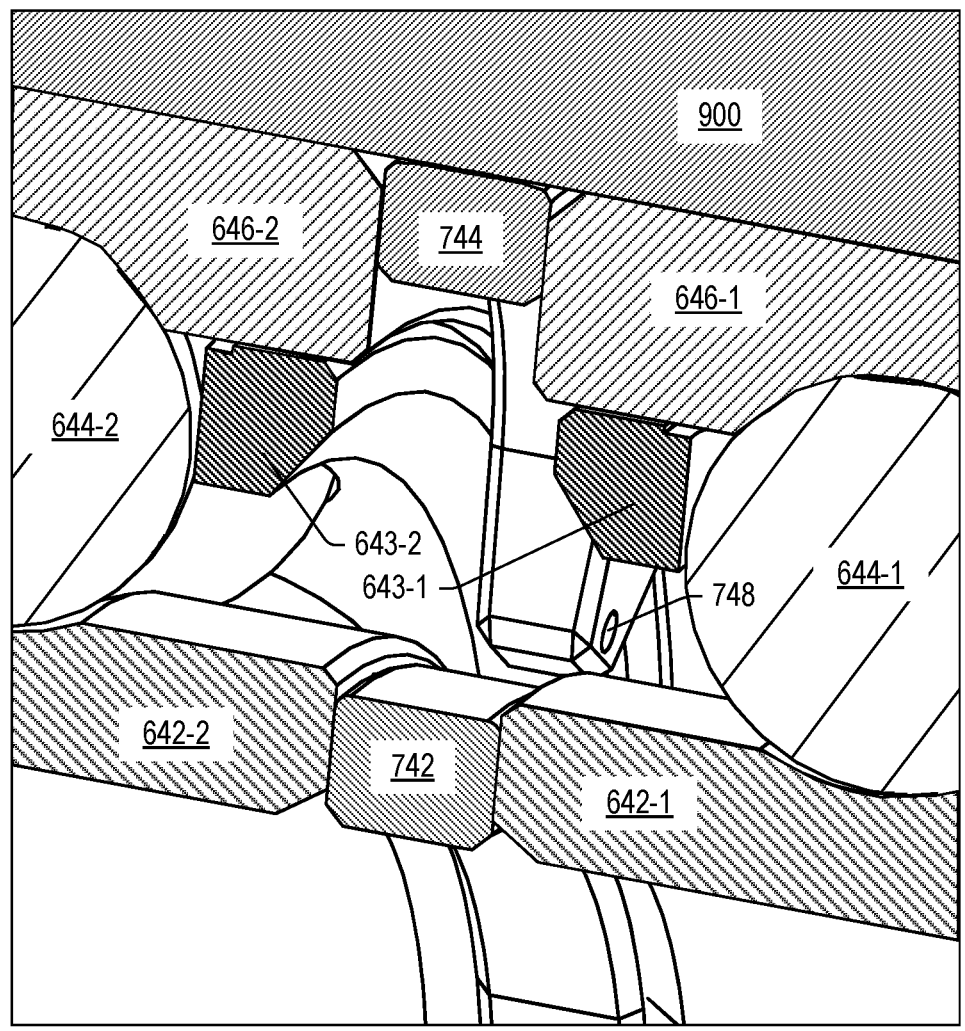
FIG. 14 is a cutaway view of a portion of an example of a flexible cartridge assembly.

FIG. 14 shows a perspective cutaway view of a portion of an example of the BCA 500 as including the flexible shell 900, the spacer 742, the spacer 744, the rolling elements 644-1 and 644-2, the inner races 642-1 and 642-2, the outer races 646-1 and 646-2 and the rolling element cages 643-1 and 643-2. As shown in FIG. 14, the spacer 744 may include one or more features of the spacer 800. For example, consider one or more lobes, one or more lubricant passages, one or more lubricant jets, etc. For example, consider a lubricant jet 748 as being in fluid communication with the lubricant opening 994 where the lubricant jet 748 can be one of two lubricant jets on an extension where one faces one direction and the other faces another direction such that a single extension can provide for lubrication of two bearing assemblies. As an example, key and keyway features may be provided such that the spacer 744 can be located in the flexible shell 900 such that lubricant openings are aligned (see, e.g., the key and keyway features of the spacer 800 and the flexible shell 900).

Figure 15:
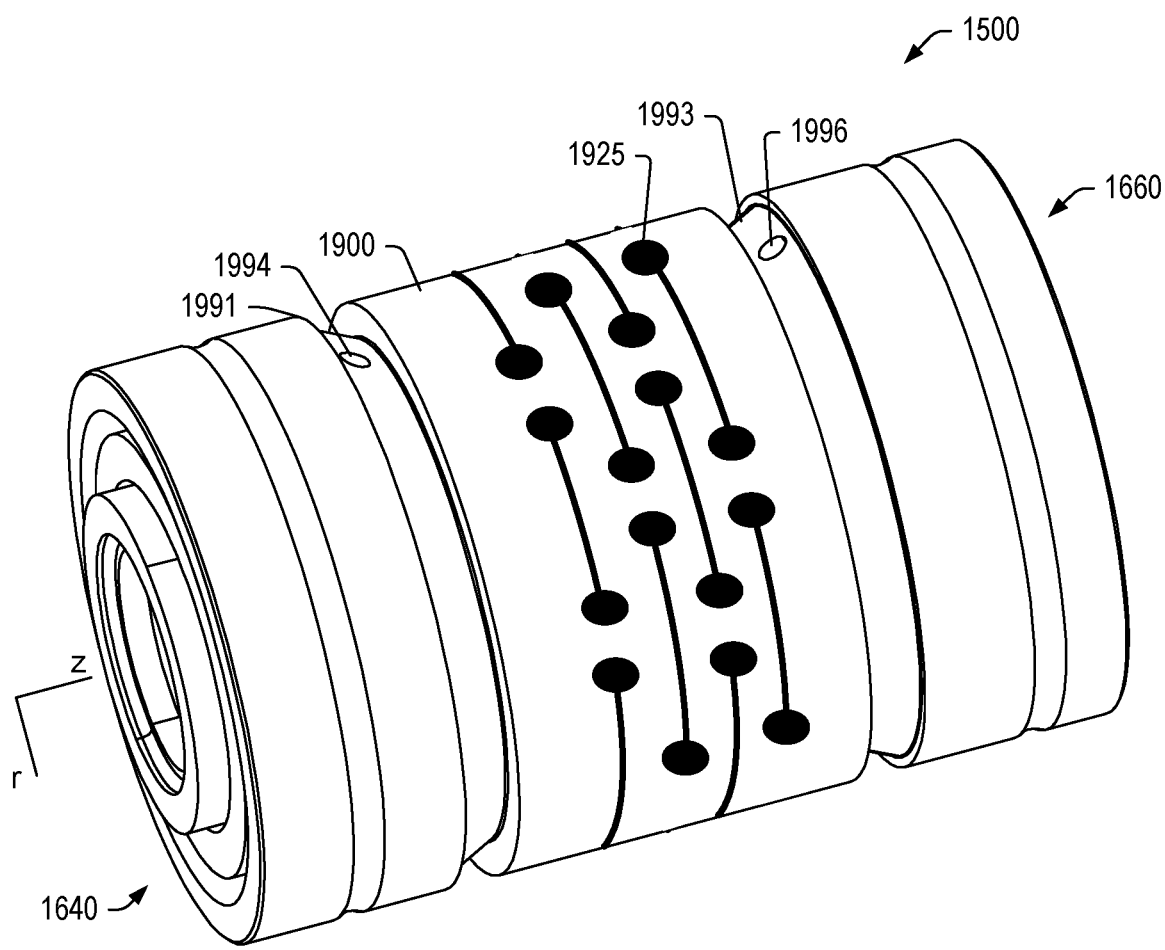
FIG. 15 is a perspective view of an example of a flexible cartridge assembly.

FIG. 15 shows an example of a bearing cartridge assembly 1500 that includes a compressor-side bearing assembly 1640, a turbine-side bearing assembly 1660 and a flexible shell 1900 where the flexible shell 1900 can be a unitary outer race for rolling elements of the compressor-side bearing assembly 1640 and rolling elements of the turbine-side bearing assembly 1660. As an example, the flexible shell 1900 can be machined from a single piece of material. As shown, the flexible shell 1900 can be made flexible via cutouts 1925, which may be formed in one or more manners and, for example, in series. In the example of FIG. 15, the flexible shell 1900 includes axial series of the cutouts 1925 where openings are substantially circular with arc portions that connect pairs of the openings. In such an example, if the flexible shell 1900 is axially compressed, it can exert an expansive force that is directed axially outwardly at outer races to apply a pre-load to rolling elements of the compressor-side bearing assembly 1640 and to apply a pre-load to rolling elements of the turbine-side bearing assembly 1660. As an example, the flexible shell 1900 can provide for some amount of bending, which may help to accommodate shaft bending (e.g., to help maintain adequate alignment of inner and outer races).

As shown in the example of FIG. 15, the flexible shell 1900 can include lubricant wells 1991 and 1993 where the lubricant well 1991 includes one or more lubricant openings 1994 for lubrication of the compressor-side bearing assembly 1640 and where the lubricant well 1993 includes one or more lubricant openings 1996 for lubrication of the turbine-side bearing assembly 1660.

Figure 16:
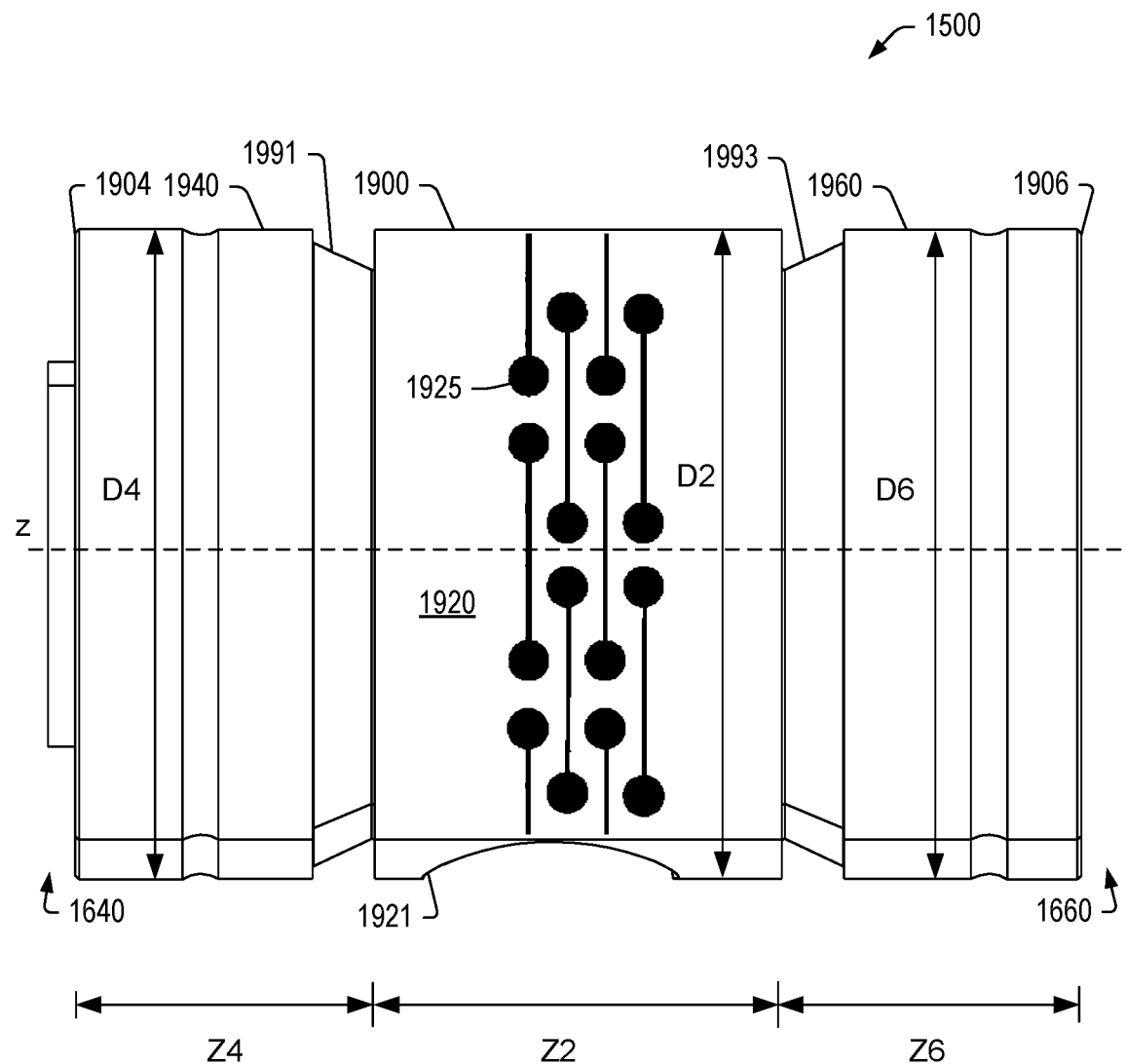
FIG. 16 is a side view of the flexible cartridge assembly of FIG. 15.

FIG. 16 shows a side view of the bearing cartridge assembly 1500. As shown, the flexible shell 1900 can include opposing ends 1904 and 1906, a compressor-side portion 1940 and a turbine-side portion 1960 where the cutouts 1925 are in a central portion 1920. In the example of FIG. 16, an opening 1921 is shown, which can be utilized as a lubricant drain, for receipt of an anti-rotation pin, etc. As shown in FIG. 16, the compressor-side portion 1940 can be defined at least in part via an axial length Z4 and an outer diameter D4, the central portion 1920 can be defined at least in part via an axial length Z2 and an outer diameter D2, and the turbine-side portion 1960 can be defined at least in part via an axial length Z6 and an outer diameter D6. In the example of FIG. 16, the lubricant wells 1991 and 1993 are shown to be formed with outer diameters that decrease inwardly toward the central portion 1920, which may help to aim lubricant jets towards the compressor-side bearing assembly 1640 and the turbine-side bearing assembly 1660.

Figure 17:
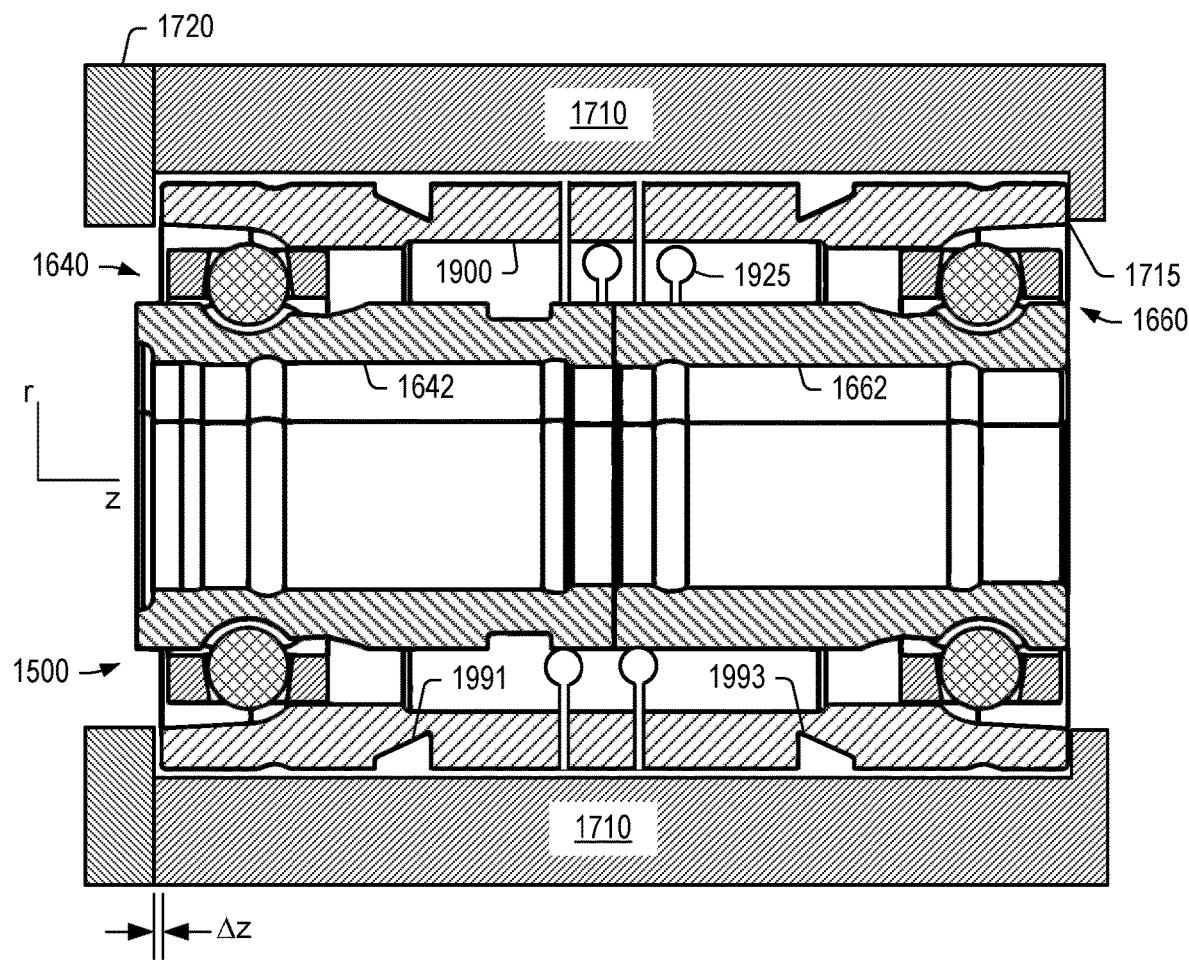
FIG. 17 is a cutaway view of the flexible cartridge assembly of FIG. 15.

FIG. 17 shows a cutaway view of the bearing cartridge assembly 1500 in a bore of a housing 1710 that includes a shoulder 1715 at one end of the bore and a thrust plate 1720 at another end of the bore. As shown in FIG. 17, the compressor-side bearing assembly 1640 can include an inner race 1642 and the turbine-side bearing assembly 1660 can include an inner race 1662 where the inner races 1642 and 1662 can contact each other. As an example, such inner races can be interference fit to a shaft where, for example, some amount of pre-load may be provided with respect to a flexible shell as rolling elements can be in contact with inner races and outer race portions of the flexible shell. As explained with respect to the example BCA 500, tightening a nut may provide for compressing an axial stack of components arranged along a shaft where shortening thereof may cause a compressive force to be applied to a flexible shell. As explained, in such an example, a gap may be closed and/or reduced. In the example of FIG. 17, consider applying a compressive force to the inner races 1642 and 1662 such that a compressive force is applied to the flexible shell 1900. In such an example, a desired pre-load may be imparted via utilization of the flexible shell 1900. As an example, closing of one or more gaps may occur responsive to application of force (e.g., a gap between the inner races 1642 and 1662). Where the flexible shell 1900 is compressed axially, the cutouts 1925 of the central portion 1920 can apply axially outwardly directed forces (e.g., pre-loads) to rolling elements of the compressor-side bearing assembly 1640 and to rolling elements of the turbine-side bearing assembly 1660.

As shown in the example of FIG. 17, the bearing cartridge assembly 1500 can be located axially via its opposing ends (e.g., left side and right side), which can provide for a certain amount of axial play to allow for thermal growth which can affect total rotor play as well. As an example, clearance (see, e.g., Δz) may be sufficient to provide for radial movement of the bearing cartridge assembly 1500, for example, as supported by a lubricant film in the housing 1710.

In the example of FIG. 17, the lubricant wells 1991 and 1993 can be formed with a radial thickness that is sufficient for purposes of carrying force(s), for example, such that deformation of the flexible shell 1900 does not occur at the lubricant wells 1991 and 1993 but rather spring-like shortening occurs via the cutouts 1925 of the central portion 1920 of the flexible shell 1900 responsive to applied force (e.g., via one or more of pre-loading, thrust force, etc.).

Figure 18A:
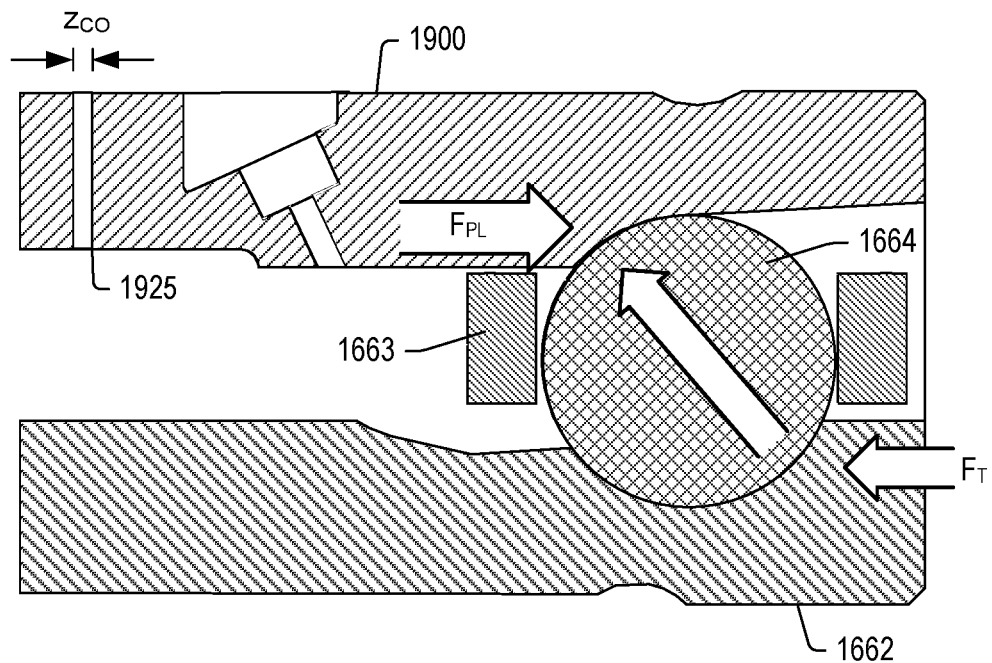
FIG. 18A and FIG. 18B are a series of cross-sectional views of a portion of the flexible cartridge assembly of FIG. 15.
Figure 18B:
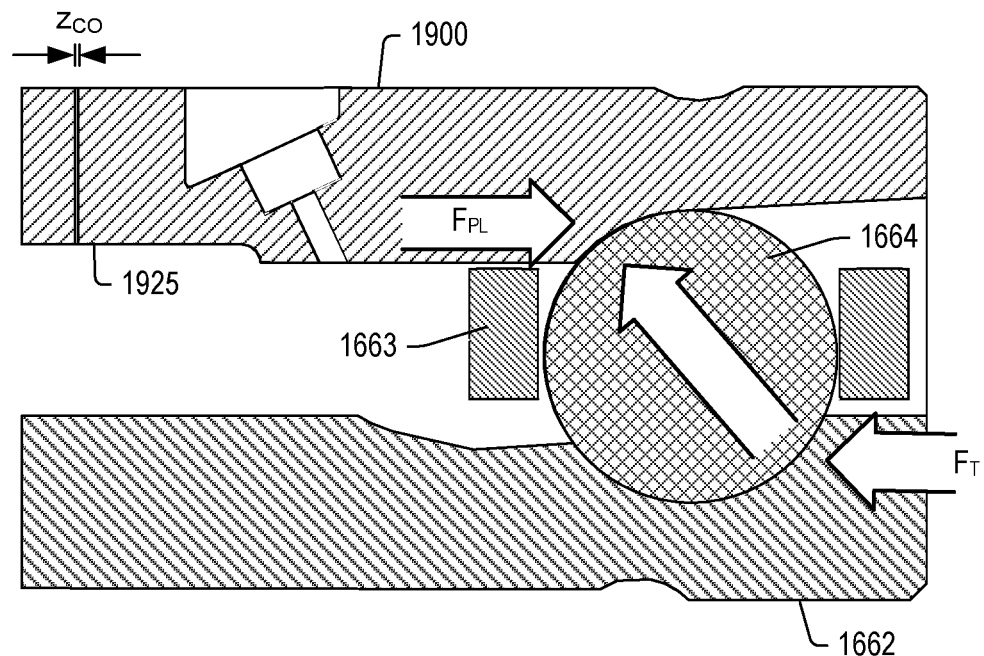

FIG. 18A and FIG. 18B show cross-sectional views of a portion of the bearing cartridge assembly 1500 where the inner race 1662 can experience a thrust force ($F_T$) that can be transferred via rolling elements 1664 contained in a cage 1663 to the flexible shell 1900, which functions as an outer race (e.g., a unitary outer race). As shown in FIG. 18A, the thrust force ($F_T$) can be met by a pre-load force ($F_{PL}$) that can exceed the thrust force ($F_T$). As shown in FIG. 18B, in some instances (e.g., depending on application, design, operational conditions, etc.), the thrust force ($F_T$) may exceed a pre-load force ($F_{PL}$) such that axial shortening may occur due to the cutouts 1925 in the flexible shell 1900.

In the example of FIGS. 18A and 18B, one of the cutouts 1925 is shown along with an axial dimension $z_{CO}$. As shown in FIGS. 18A and 18B, where the thrust force ($F_T$) increases, the axial dimension $z_{CO}$ can decrease where it can be limited by contact of opposing sides of the cutout 1925 (e.g., along an arced slot, etc.). In such a manner, where contact occurs between opposing sides of the cutout 1925, the flexibility of the flexible shell 1900 can be greatly reduced such that further shortening of the flexible shell 1900 does not occur. Hence, by appropriate design of the shape, size, orientation and number of cutouts 1925, the flexibility of the flexible shell 1900 can be limited, which can provide for limited axial movement of a shaft (e.g., a rotating assembly). Limited axial movement of a shaft (e.g., a rotating assembly) can help to maintain clearance, for example, between a turbine wheel and a turbine wheel shroud and/or a compressor wheel and a compressor wheel shroud such that contact does not occur between a wheel and a wheel shroud; noting that such contact has the potential to result in catastrophic failure of a wheel. As an example, the flexible shell 1900 can be designed to provide a pre-load that may be greater than a thrust force. In such an example, the flexible shell 1900 may not experience axial shortening.

As explained, some amount of axial clearance (see, e.g., Δz of FIG. 17) can be provided between a plate and a shoulder for the BCA 1500, which may provide for thermal growth and radial movement. Such axial clearance may be considered in combination with how much shortening may occur for the flexible shell 1900 for purposes of reducing risk of contact between a wheel and a wheel shroud. Such an approach may also consider pre-load with respect to expected maximum thrust force.

As an example, a total available axial compression (e.g., shortening) due to cutouts may be less than approximately 2 mm, less than approximately 1 mm, etc. For example, consider a series of cutouts where each may be less than approximately 0.5 mm and greater than approximately 0.05 mm. As an example, some amount of lubricant may flow via one or more cutouts. As an example, cutouts may be machined into a unitary outer race using a drilling tool to drill holes and a cutting tool to cut slits where, for example, the slits can extend between two or more holes, etc. As an example, cutouts may be positioned in series axially. For example, consider a series of at least three sets (e.g., three sets, four sets, five sets, etc.), which can provide for spring-like action. In the example of FIGS. 15, a series of four sets is shown where each set may include a number of cutouts (e.g., two three, four, five, etc.). As an example, a series of cutouts may be configured to provide a desired amount of bendability to a flexible shell where, for example, an increasing number of sets in a series may provide for increased bendability; noting that a flexible shell may be configured for a maximum bendability as may be determined in part via a lubricant film clearance between an outer surface of the flexible shell and a bore surface of a housing.

As an example, a method can involve pre-loading a bearing cartridge assembly prior to securing a plate to a compressor side of a housing where securing the plate provides a desired axial clearance between a flexible shell of the bearing cartridge assembly and the plate (e.g., and a shoulder, etc.). As an example, a method may include securing a plate to a compressor side of a housing to contact and/or compress a flexible shell of a bearing cartridge and then applying a load that compresses the flexible shell to relieve the load applied by the plate. For example, consider shortening a flexible shell via closing a gap and/or compressing one or more components arranged along a shaft such that an axial clearance is formed with respect to the flexible shell and axial locating components (e.g., a plate and a shoulder, etc.).

As an example, a flexible cartridge assembly (see, e.g., BCAs 500 and 1500) can include a flexible shell (see, e.g., flexible shells 900 and 1900) that include a flexible portion (see, e.g., flexible portions 920 and 1920) disposed between a compressor-side portion (see, e.g., compressor-side portions 940 and 1940) and a turbine-side portion (see, e.g., turbine-side portions 960 and 1960), where the flexible portion includes a series of arc-shaped cutouts (see, e.g., the cutouts 925 and 1925) disposed axially along at least a portion of the flexible portion; a compressor-side bearing assembly (see, e.g., the compressor-side bearing assemblies 940 and 1940); and a turbine-side bearing assembly (see, e.g., the turbine-side bearing assemblies 960 and 1960).

As an example, a flexible cartridge assembly can include a flexible shell that includes a flexible portion disposed between a compressor-side portion and a turbine-side portion, where the flexible portion includes a series of arc-shaped cutouts disposed axially along at least a portion of the flexible portion; a compressor-side bearing assembly; and a turbine-side bearing assembly. In such an example, one or more of the bearing assemblies can include an outer race or outer races and/or the flexible shell can function as an outer race or outer races (e.g., via one or more inner surface races that can be formed into an inner surface of the flexible shell).

As an example, a flexible portion can have an axial length that exceeds an axial length of at least one of a compressor-side portion and a turbine-side portion. As an example, a turbine-side portion can include an outer diameter that can be less than an outer diameter of a compressor-side portion. As an example, an outer diameter of the flexible portion is greater than the outer diameter of the turbine-side portion.

As an example, a compressor-side portion of a flexible shell can include a squeeze film damper outer surface and/or a turbine-side portion of a flexible shell can include a squeeze film damper outer surface.

As an example, a flexible cartridge assembly can include at least one spacer that comprises at least one lubricant jet.

As an example, a flexible cartridge assembly can include a series of arc-shaped cutouts disposed axially along at least a portion of a flexible portion of a flexible shell where an axial series includes at least three arc-shaped cutouts or, for example, at least four arc-shaped cutouts or, for example, at least five arc-shaped cutouts.

As an example, a flexible portion of a flexible shell can include a sensor opening that can receive at least a portion of a sensor and/or allow for sensing (e.g., consider sensing of shaft rotational speed, etc.).

As an example, a compressor-side bearing assembly can include at least one rolling element bearing assembly. For example, consider a compressor-side bearing assembly that includes two rolling element bearing assemblies.

As an example, a flexible shell can include a rim. For example, consider a rim that is disposed at a compressor-side end of the flexible shell. In such an example, the rim may include a notch that can be a part of an anti-rotation mechanism (e.g., an anti-rotation notch that receives an extension or other component).

As an example, a compressor-side portion of a flexible shell can include an internal shoulder that axially locates a compressor-side bearing assembly. In such an example, the internal shoulder may be formed via a component such as a spacer that is received by the flexible shell (e.g., in a groove, etc.).

As an example, a spacer can include a key where a flexible shell includes a keyway for locating the spacer via the key. For example, consider an arrangement where the key and keyway azimuthally locate the spacer with respect to the flexible shell.

As an example, a turbocharger can include a compressor assembly; a turbine assembly; a bearing housing; and a flexible cartridge assembly that includes a flexible shell that includes a flexible portion disposed between a compressor-side portion and a turbine-side portion, where the flexible portion includes a series of arc-shaped cutouts disposed axially along at least a portion of the flexible portion; a compressor-side bearing assembly; and a turbine-side bearing assembly.

As an example, a flexible cartridge assembly can include one or more of various features, for example, in one or more combinations.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A flexible cartridge assembly comprising:
   a flexible shell that comprises a flexible portion disposed between a compressor-side portion and a turbine-side portion, wherein the flexible portion comprises a series of arc-shaped cutouts disposed axially along at least a portion of the flexible portion;
   a compressor-side bearing assembly; and
   a turbine-side bearing assembly.

2. The flexible cartridge assembly of claim 1, wherein the flexible portion comprises an axial length that exceeds an axial length of at least one of the compressor-side portion and the turbine-side portion.

3. The flexible cartridge assembly of claim 1, wherein the turbine-side portion comprises an outer diameter that is less than an outer diameter of the compressor-side portion.

4. The flexible cartridge assembly of claim 1, wherein an outer diameter of the flexible portion is greater than an outer diameter of the turbine-side portion.

5. The flexible cartridge assembly of claim 1, wherein the compressor-side portion comprises a squeeze film damper outer surface.

6. The flexible cartridge assembly of claim 1, wherein the turbine-side portion comprises a squeeze film damper outer surface.

7. The flexible cartridge assembly of claim 1, comprising at least one spacer that comprises at least one lubricant jet.

8. The flexible cartridge assembly of claim 1, wherein the series of arc-shaped cutouts disposed axially along at least a portion of the flexible portion comprises an axial series of at least three arc-shaped cutouts.

9. The flexible cartridge assembly of claim 1, wherein the series of arc-shaped cutouts disposed axially along at least a portion of the flexible portion comprises an axial series of at least four arc-shaped cutouts.

10. The flexible cartridge assembly of claim 1, wherein the series of arc-shaped cutouts disposed axially along at least a portion of the flexible portion comprises an axial series of at least five arc-shaped cutouts.

11. The flexible cartridge assembly of claim 1, wherein the flexible portion comprises a sensor opening.

12. The flexible cartridge assembly of claim 1, wherein the compressor-side bearing assembly comprises at least one rolling element bearing assembly.

13. The flexible cartridge assembly of claim 1, wherein the compressor-side bearing assembly comprises two rolling element bearing assemblies.

14. The flexible cartridge assembly of claim 1, wherein the flexible shell comprises a rim.

15. The flexible cartridge assembly of claim 14, wherein the rim is disposed at a compressor-side end of the flexible shell.

16. The flexible cartridge assembly of claim 1, wherein the compressor-side portion comprises an internal shoulder that axially locates the compressor-side bearing assembly.

17. The flexible cartridge assembly of claim 1, comprising a spacer that comprises a key wherein the flexible shell comprises a keyway for locating the spacer via the key.

18. The flexible cartridge assembly of claim 17, wherein the key and keyway azimuthally locate the spacer with respect to the flexible shell.

19. A turbocharger comprising:
a compressor assembly;
a turbine assembly;
a bearing housing; and
a flexible cartridge assembly that comprises a flexible shell that comprises a flexible portion disposed between a compressor-side portion and a turbine-side portion, wherein the flexible portion comprises a series of arc-shaped cutouts disposed axially along at least a portion of the flexible portion; a compressor-side bearing assembly; and a turbine-side bearing assembly.

* * * * *